(12) United States Patent
Moon et al.

(10) Patent No.: US 11,564,187 B2
(45) Date of Patent: Jan. 24, 2023

(54) METHOD AND DEVICE FOR SUPPORTING CONFIGURATION OF TIME SYNCHRONIZATION NETWORK IN MOBILE COMMUNICATION NETWORK

(71) Applicant: Samsung Electronics Co., Ltd., Suwon-si (KR)

(72) Inventors: Sangjun Moon, Suwon-si (KR); Yoonseon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 36 days.

(21) Appl. No.: 17/396,990

(22) Filed: Aug. 9, 2021

(65) Prior Publication Data
US 2022/0046570 A1    Feb. 10, 2022

(30) Foreign Application Priority Data
Aug. 10, 2020    (KR) .......................... 10-2020-0100152

(51) Int. Cl.
*H04W 56/00*    (2009.01)
(52) U.S. Cl.
CPC .............................. *H04W 56/0015* (2013.01)
(58) Field of Classification Search
CPC .. H04J 3/0641; H04J 3/0667; H04W 56/0015
USPC ........................................................ 370/350
See application file for complete search history.

(56) References Cited

U.S. PATENT DOCUMENTS

| | | | |
|---|---|---|---|
| 9,998,247 B1 | 6/2018 | Choudhury et al. | |
| 2016/0080459 A1 | 3/2016 | Kuwelkar et al. | |
| 2016/0277138 A1 | 9/2016 | Garg et al. | |
| 2018/0013508 A1 | 1/2018 | Rabinovich et al. | |
| 2021/0099341 A1* | 4/2021 | Moon | H04J 3/0667 |
| 2021/0359778 A1* | 11/2021 | Wang | H04J 3/0644 |
| 2021/0367695 A1* | 11/2021 | Moon | H04W 56/001 |
| 2022/0103335 A1* | 3/2022 | Moon | H04L 7/005 |
| 2022/0149964 A1* | 5/2022 | Kang | H04L 41/0806 |
| 2022/0174631 A1* | 6/2022 | Xiong | H04J 3/0667 |

(Continued)

OTHER PUBLICATIONS

Ericsson; Addressing wording comments from IEEE LS response on TSN support; SA WG2 Meeting #S2-140E; S2-200xxxx (revision of S2-20xxxxx); Aug. 19-Sep. 2, 2020; Electronic.

(Continued)

*Primary Examiner* — Robert J Lopata
(74) *Attorney, Agent, or Firm* — Jefferson IP Law, LLP

(57) ABSTRACT

The disclosure relates to a communication method and system for converging a 5G communication system for supporting higher data rates beyond a 4G system with a technology for IoT. A method of a NW-TT is provided. The method includes receiving a first announce message via user plane from a first DS-TT using a first PDU session between the NW-TT and the first DS-TT, receiving a second announce message from a N6 interface, determining port states for each port of the first DS-TT and the NW-TT with the first and second announce message using a BMCA procedure, if GM is external to a time synchronization network, generating a third announce message based on the first and second announce message for each master port in the first DS-TT and the NW-TT, and transmitting the third announce message to the first PDU session related to the master port in the first DS-TT.

20 Claims, 19 Drawing Sheets

(56) References Cited

U.S. PATENT DOCUMENTS

2022/0210755 A1* 6/2022 Xiong ................. H04W 56/002
2022/0216932 A1* 7/2022 Wang .................... H04J 3/0641
2022/0311533 A1* 9/2022 Wang ..................... H04L 69/28

OTHER PUBLICATIONS

Huawei et al.; Discussion on delivery of gPTP messages for time synchronization; 3GPP TSG CT WG1 Meeting #121; C1-198234; Nov. 11-15, 2019; Reno (US).
Intel; Generation of gPTP messages when 5GS acts as TSN GM clock; SA WG2 Meeting #S2-138E; S2-2003158 (revision of S2-200xxxx); Apr. 20-24, 2020, Electronic meeting.
Samsung; Information Carried Inside 5G System for the UL; 3GPP TSG-SA WG2 Meeting #134; S2-1907706; Jun. 24-28, 2019; Sapporo, Japan.
Intel; On the usage of rateRatio, one-step vs two-step sync operation and dedicated QoS Flow; SA WG2 Meeting #S2-134; S2-1908317 (revision of S2-1907758); Jun. 24-28, 2019; Sapporo, JP.
International Search Report with Written Opinion dated Nov. 8, 2021; International Appln. No. PCT/KR2021/010522.

* cited by examiner

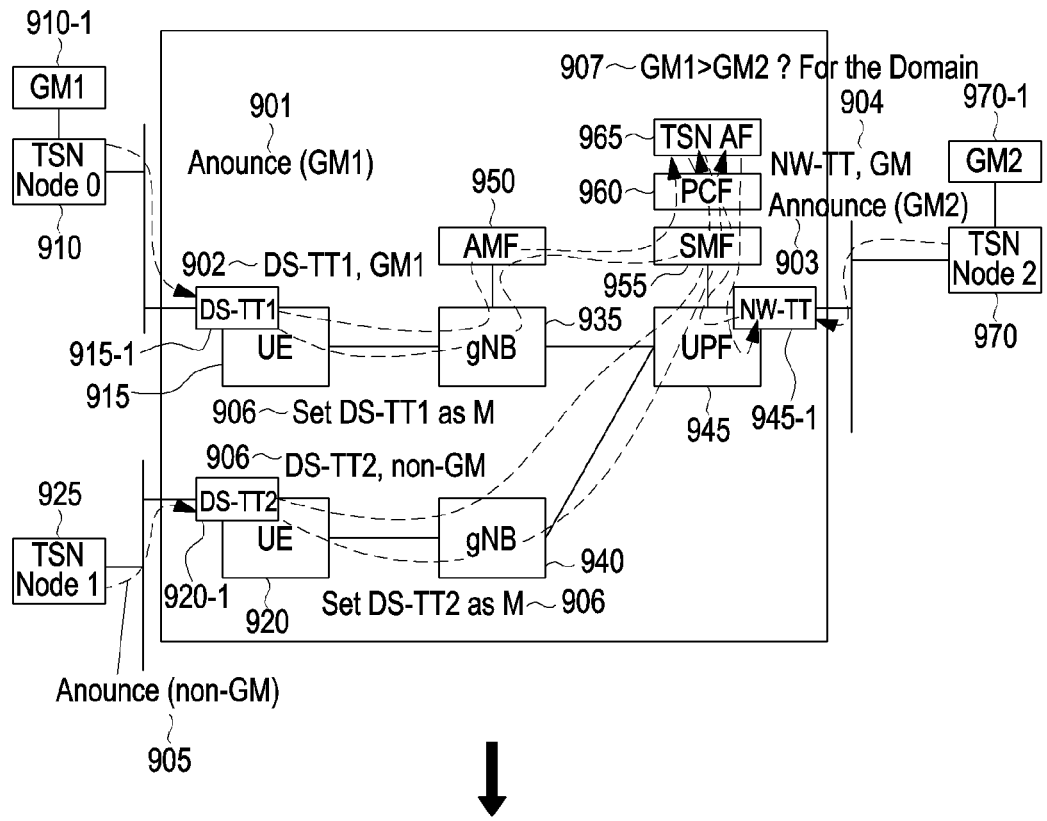
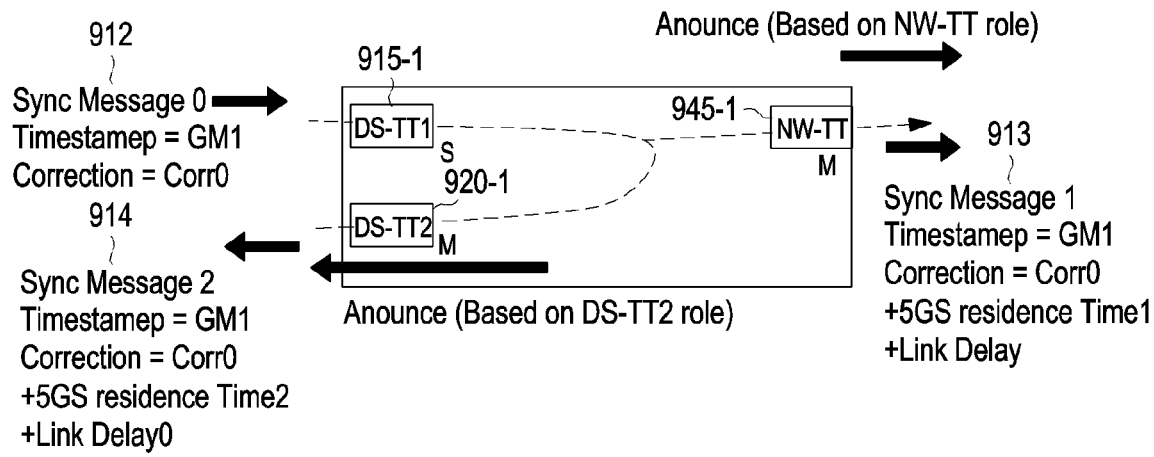
FIG.9

METHOD AND DEVICE FOR SUPPORTING CONFIGURATION OF TIME SYNCHRONIZATION NETWORK IN MOBILE COMMUNICATION NETWORK

CROSS-REFERENCE TO RELATED APPLICATION(S)

This application is based on and claims priority under 35 U.S.C. § 119(a) of a Korean patent application number 10-2020-0100152, filed on Aug. 10, 2020, in the Korean Intellectual Property Office, the disclosure of which is incorporated by reference herein in its entirety.

BACKGROUND

1. Field

The disclosure relates to a method for providing a mobile communication network function that supports a time synchronization method or a time synchronization network in a mobile communication system. The time synchronization network refers to a network composed of a device, protocol, or methods that provide synchronization to allow a user equipment (UE) or network devices constituting a specific network to have the same time information (clock). More particularly, the disclosure relates to a device and a method for configuring and managing a network for transferring time synchronization information complying with the purpose of the time synchronization network.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Various embodiments of the disclosure relate to methods for supporting time synchronization to allow specific UEs to form a physical or virtual network for communication and have the same time (clock)-related information by sharing time information therebetween in a context where a mobile communication UE and a server or another UE located in an external network communicate with each other. Some embodiments of the disclosure include a method for gathering and configuring information for configuring a network for transferring time synchronization information.

In general, a time synchronization network as defined by the institute of electrical and electronics engineers (IEEE) is formed by exchanging time synchronization-related information between the devices constituting a physical network based on Ethernet. In general, for the purpose of exchanging time synchronization information, each device uses a gPTP or precision time protocol (PTP), and related contents are defined in the IEEE 1588 standard. The (g)PTP protocol is responsible for exchanging of information related to the exchange of time synchronization information and transmitting and receiving the related information and, for configuration, management, transmission and reception to configure a local area network (LAN) that supports an actual time synchronization network, such standards as IEEE 802.1AS, IEEE 802.1Q, and IEEE 802.1Qcc, may be used.

The 5G mobile communication network provides functions to support time sensitive communication, and these functions support some of the contents of IEEE 1588 and IEEE 802.1-related standards. These functions include time synchronization methods using the (g)PTP protocol. The disclosure includes methods of configuration related to transfer of time synchronization information over a 5G network and thus includes methods that allow the UE or 5G network itself to operate as a reference clock (grand master clock) of the time synchronization network, which is not achieved by legacy 5G.

Aspects of the disclosure are not limited to the foregoing, and other unmentioned aspects would be apparent to one of ordinary skill in the art from the following description.

Aspects of the disclosure are to address at least the above-mentioned problems and/or disadvantages and to provide at least the advantages described below. Accordingly, an aspect of the disclosure is to provide a method for providing a mobile communication network function that supports a time synchronization method or a time synchronization network in a mobile communication system.

Additional aspects will be set forth in part in the description which follows and, in part, will be apparent from the description, or may be learned by practice of the presented embodiments.

In accordance with an aspect of the disclosure, a method of a network side time synchronization network (TSN) translator (NW-TT) is provided. The method includes receiving a first announce message via user plane from a first device TSN translator (DS-TT) using a first packet data unit (PDU) session between the NW-TT and the first DS-TT, receiving a second announce message from a N6 interface, determining port states for each port of the first DS-TT and the NW-TT with the first announce message and the second announce message using a best master clock algorithm (BMCA) procedure, if grand master (GM) is external to a time synchronization network including the NW-TT and the first DS-TT, generating a third announce message based on the first announce message and the second announce message for each master port in the first DS-TT and the NW-TT, and transmitting the third announce message to the first PDU session related to the master port in the first DS-TT.

In accordance with another aspect of the disclosure, a NW-TT is provided. The NW-TT includes a plurality of ports including a first port and a second ports, and a processor configured to control the first port of the plurality of the ports to receive a first announce message via user plane from a first DS-TT using a first PDU session between the NW-TT and the first DS-TT, control the second port of the plurality of the ports to receive a second announce message from a N6 interface, determine port states for each port of the first DS-TT and the NW-TT with the first announce message and the second announce message using a BMCA procedure, if GM is external to a time synchronization network including the NW-TT and the first DS-TT, generating a third announce message based on the first announce message and the second announce message for each master port in the first DS-TT and the NW-TT, and control the first port of the plurality of the ports to transmit the third announce message to the first PDU session related to the master port in the first DS-TT.

Currently, the number of UEs using mobile communication networks and the number of services and applications to support them are increasing exponentially. Further, the design and operation of wireless networks and core networks are becoming increasingly sophisticated to enhance the quality of mobile communication networks. In this situation, in addition to UEs simply using voice calls and data services, new types of UEs, such as factories, unmanned aerial vehicles, robots, cars, and airplanes, are emerging. These new types of UEs are expected to steadily increase, and mobile communication networks would also continue to evolve services to effectively support their purposes.

While the purposes and types of various UEs are changing, all UEs in the mobile communication network share radio resources, and in general, the core network is also operated to be shared by all UEs. Since each UE has a different type and purpose, there is a difference in the type of operation and the service used. This leads to a difference in the interaction with the network. Therefore, the mobile communication network need maintain an optimized configuration by analyzing the purpose and service requirements for each UE so as to effectively support each type of UE. Further, to effectively support each UE and services, the network needs to be operated to continuously provide the desired level of services at the lowest cost through the understanding of the characteristics of each UE and optimization and automation of configuration and management.

The disclosure concerns methods for delivering time-sensitive traffic within a time range required by the service in transmitting network traffic among various services used through a mobile communication system. In particular, for professional audio, video, and image-related services, time-related requirements are strict in the delivery of traffic. To effectively process time sensitive traffic, a time synchronization function and a deterministic communication function are required. The time synchronization function is a function that synchronizes the time (or clock) between devices constituting the network to share the same time, and the deterministic communication function is a function that ensures that packets are delivered within a specific time range. Some embodiments of the disclosure include a feature capable of efficiently transmitting a time synchronization function in a 5G mobile communication network.

A time synchronization and deterministic communication function of the related art is possible only when a short-range network is configured using a bridge supporting a time sensitive network (TSN) and a special application server, time sensitive network application function (TSN AF), supports the related functions. Further, since a reference clock (grand master clock) for time synchronization is located in an external network, time synchronization packets are transmitted only in the downward direction. Therefore, supporting the cases where a device positioned on the side of the UE or the 5G network itself becomes the reference clock is limited in configuring the time synchronization network along with the 5G network. Due to such limitations, if the UE side or 5G network itself becomes the reference clock, it is impossible to configure a network layer for transferring time synchronization information and transfer each time synchronization packet in configuring a network for transferring time information. The disclosure includes a method for supporting configurations related to the transfer of time synchronization packets in the control plane using an AF located outside the network and seamlessly providing the time synchronization packets according to the purpose. The disclosure also includes a method for supporting configurations related to the transfer of time synchronization packets in a manner distributed in the user plane without the aid of the AF located outside the network and seamlessly providing the time synchronization packets according to the purpose. Therefore, more flexibility may be added in configuring a time synchronization network, and time sensitive communication may be supported for more applications.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 illustrates operations and results of a method for supporting a BMCA to which a control plane-based centralized information processing scheme is applied, according to an embodiment of the disclosure;

Throughout the drawings, like reference numerals will be understood to refer to like parts, components, and structures.

DETAILED DESCRIPTION

Figure 1:
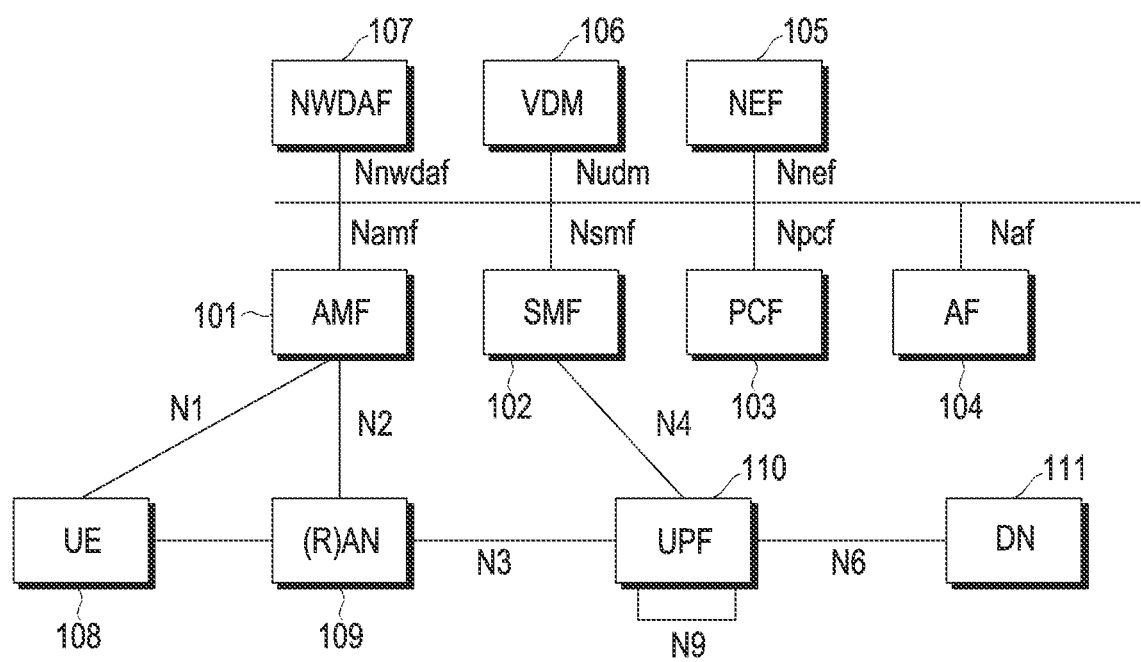
FIG. 1 illustrates a configuration of a mobile communication system of a 5G network and entities located outside the network according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a", "an", "the" include plural referents unless the context clearly dictates otherwise. Thus, for example, reference to "a component surface" includes reference to one or more of such surfaces.

In describing embodiments, the description of technologies that are known in the art and are not directly related to the disclosure is omitted. This is for further clarifying the gist of the disclosure without making it unclear.

For the same reasons, some elements may be exaggerated or schematically shown. The size of each element does not necessarily reflects the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more CPUs in a device or a security multimedia card. According to embodiments of the disclosure, a " . . . unit" may include one or more processors.

The description of embodiments of the disclosure focuses primarily on the radio access network, new RAN (NR), and the core network, packet core (5G system, or 5G core network, or NG core, or next generation core), which are specified by the 3rd generation partnership (3GPP) which is a mobile communication standardization organization. However, the subject matter of the disclosure, or slight changes thereto, may also be applicable to other communication systems that share similar technical backgrounds without departing from the scope of the disclosure, which would readily be appreciated by one of ordinary skill in the art.

For ease of description, some of the terms or names defined in the 3GPP long-term evolution (LTE) standards (5G, NR, LTE, or similar systems) may be used. However, the disclosure is not limited by such terms and names and may be likewise applicable to systems conforming to other standards.

As used herein, terms for identifying access nodes, terms denoting network entities, terms denoting messages, terms denoting inter-network entity interfaces, and terms denoting various pieces of identification information are provided as an example for ease of description. Thus, the disclosure is not limited by the terms, and such terms may be replaced with other terms denoting aspects with equivalent technical concept.

Hereinafter, among various elements constituting a core network, entities directly related to the disclosure will be described as an example.

FIG. 1 illustrates a configuration of a mobile communication system of a 5G network and entities located outside the network according to an embodiment of the disclosure.

Referring to FIG. 1, the entities interact with each other using a service based interface.

An access and mobility management function (AMF) 101 is a device for managing access and mobility of the user equipment (UE) 108 and plays a role as a UE-core network endpoint that connects the UE to other devices in the core network via an RAN 109. Functions provided by the AMF 101 may include, e.g., functions of UE registration, connection, reachability, mobility management, access identification/authentication, and mobility event generation.

A session management function (SMF) 102 performs a management function of a packet data unit (PDU) session of the UE. For example, the SMF 102 may perform such functions as session management functions of establishing, modifying, or releasing a session and maintaining a tunnel between the UPF 110 and the (R)AN 109 necessary therefor, the functions of allocating and managing an IP address of the UE 108, address resolution protocol (ARP) proxy functions, selection and control of the user plane, control of traffic processing on the UPF 110, and billing data gathering control.

A policy control function (PCF) 103 plays a role to determine and provide a policy for access/mobility and session management which is applied to the AMF 101 and the SMF 102. For example, the PCF 103 may manage (or govern) the behavior of the entire network and provide policies to be carried out to network functions (NFs) constituting the control plane. Further, the PCF 103 may access information related to policy making by accessing the UDR.

A network exposure function (NEF) 105 is responsible for transmitting or receiving an event occurring in the mobile communication network and a supported capability to/from the outside. For example, the NEF 105 performs functions, such as safe provisioning of external application information to the core network, conversion of internal/external information, and storing in the UDR and then redistributing the functions received from other NFs.

A unified data management (UDM) 106 and a unified data repository (UDR) are independent network functions, but in this embodiment, their functions and roles are similarly used and simultaneously described. The UDM 106 may perform, e.g., generation of AKA authentication information for 3GPP security, processing of the user identifier (ID), reverse concealment of the secured user identifier (subscriber concealed ID (SUPI)), management of the list of NFs currently supported by the UE 108, and short messaging service (SMS) management. The UDR may perform the functions of storing and providing subscriber information managed by the UDM 105, structured data for exposure, and application data related to NEF or service.

A user plane function (UPF) 110 plays a role to process actual user data and may process packets so that packets generated by the UE 108 are transferred to an external data network or the data received from the external data network is transferred to the UE. Major functions provided by the UPF 110 may include, e.g., acting as an anchor between radio access technologies, providing connectivity with PDU sessions and external data networks 111, packet routing and forwarding, packet inspection, application of user plane policy, creating a traffic usage report, or buffering.

A network data analytics function (NWDAF) 107 may gather events or information occurring within the network and transfer statistics, predictions, and recommendation information related to specific information to the NF, AF, and OAM using an analysis tool or machine learning tool. For example, the NWDAF 107 may perform functions, such as gathering data from NF/AF/OAM, registering NWDAF services and exposing metadata, and providing network analysis information to NF/AF.

A UE radio capability management function (UCMF) performs the function of storing and providing mapping information between the ID of the radio access-related function of the UE 108 assigned by the PLMN or the manufacturer and the actual function in the form of a dictionary.

An application function (AF) 104 performs a function interworking with the core network of 3GPP to provide a service. The AF 104 may be largely divided into a trusted AF and an untrusted AF. The trusted AF 104 may utilize the service of network functions located inside the core network without a separate intermediate function such as the NEF 105. Representative functions provided by the AF 104 may include application influence on traffic routing, utilization of network information exposure function, interaction with the policy framework for policy control, and IMS-related interactions.

An operation, administration and maintenance (OAM) is a device for managing the entire mobile communication network including the base station and the core network. For example, the OAM may perform functions related to communication network operation, management, maintenance, provisioning, and problem solving. Further, the OAM may perform the functions of monitoring and configuring the functions of each base station or core network to operate seamlessly according to the design and policy. OAM is a concept that encompasses all tools and procedures related to management and may include all tools, software, and procedures used by the network administrator for management, rather than denoting a specific device.

In the legacy 5G network, to satisfy various requirements, such as various factory automation and media processing for professionals, time-sensitive communication-related functions are designed to be supported by interworking with IEEE 1588, 802.1Q, and 802.1Acc specified by IEEE. The 5G network introduces a structure that processes time synchronization protocols, such as network side TSN translator (NW-TT) and device side TSN translator (DS-TT) in the UE and UPF and supports a method for configuring a forwarding scheme and managing a bridge related to time-sensitive traffic, such as TSN AF. Support for time sensitive communication aims to support some sections of the local area network located outside the mobile communication network through a 5G section, and the 5G network in the local area network located outside serves as a single bridge. Therefore, the DS-TT located in the 5G UE and the NW-TT located in the network operate as supporting their respective ports, and the section between the UE and the UPF has the same effect as passing through the data path for the internal transmission of the bridge. In this configuration, there is a special type of AF named a TSN AF for deterministic communication and control of the characteristics of each port, and the TSN AF may constitute a network supporting time sensitive communication that may meet the purpose and requirements by communicating with the centralized network configuration (CNC) managing the 5G network and the local area network. During this course, the TSN AF may configure and manage a bridge and exchange service quality requirements, which need to be provided from the bridge, with the 5G core network so as to interwork with the external TSN network and the CNC operating as per the IEEE standards. Therefore, TSN AF is essentially required, which may convert (or map) the commands from the CNC into the form that may be processed by 5GC (5G Core). There are two main operations performed by the TSN AF, which include delivery of QoS-related requirements in the user plane transmission section between the UE and the UPF and delivery of bridge configuration-related information. Therefore, the TSN AF should necessarily exist to perform the operation of TSN in the legacy core network.

Figure 2:
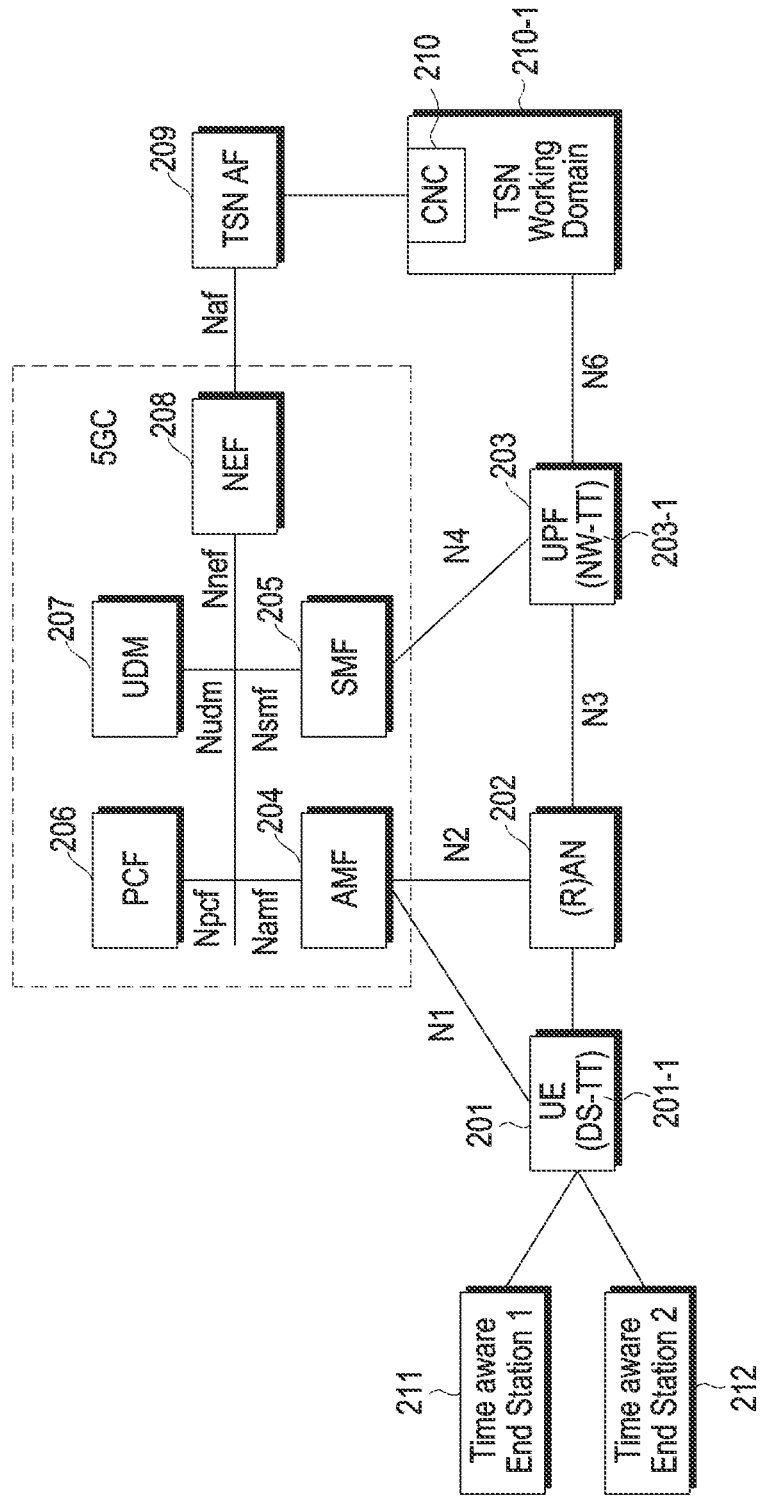
FIG. 2 illustrates a structure of a TSN as defined in a legacy 3GPP standard according to an embodiment of the disclosure.

FIG. 2 illustrates a structure of a TSN as defined in a legacy 3GPP standard according to an embodiment of the disclosure. FIG. 2 briefly illustrates only entities required for TSN support. A TSN working domain 210-1 may be a local area communication network configured with ethernet supporting legacy IEEE standards and may include an entity corresponding to the control plane, such as a CNC 210.

Referring to FIG. 2, a basic design related to TSN interworking in the legacy 5G network aims to support time sensitive communication for the UE using the 5G mobile communication network and the local area network located outside and it is basically assumed that devices providing main functions and each configuration are located in a network outside the UPF 203. Therefore, the time synchronization reference clock (grand master clock, GM) is designed assuming that it is located outside, but not in the 5G core network. Accordingly, when a time synchronization packet is transmitted through an N6 interface from the external network, transmission of the time synchronization packet in the downward direction from the NW-TT 203-1 to the DS-TT 201-1 is supported. In this case, the packet transmission may be carried out by transferring the time synchronization packet using the PDU session related to all the NW-TTs connected to the UPF 203 supporting a specific NW-TT 203-1. During this course, the NW-TT 203-1 may measure the spent time (residence time) in the UE 201. The UPF 203 section of 5G is based on the time difference between the time when the packet is received by the 5G network and the time when the packet is received by the DS-TT 201-1 and, by using the same, transmit network traffic considering the residence time in a specific network section.

Referring to FIG. 2, a (R)AN 202, AMF 204, SMF 205, PCF 206, UDM 207, NEF 208 and TSN AF 209 are also included.

Figure 3:
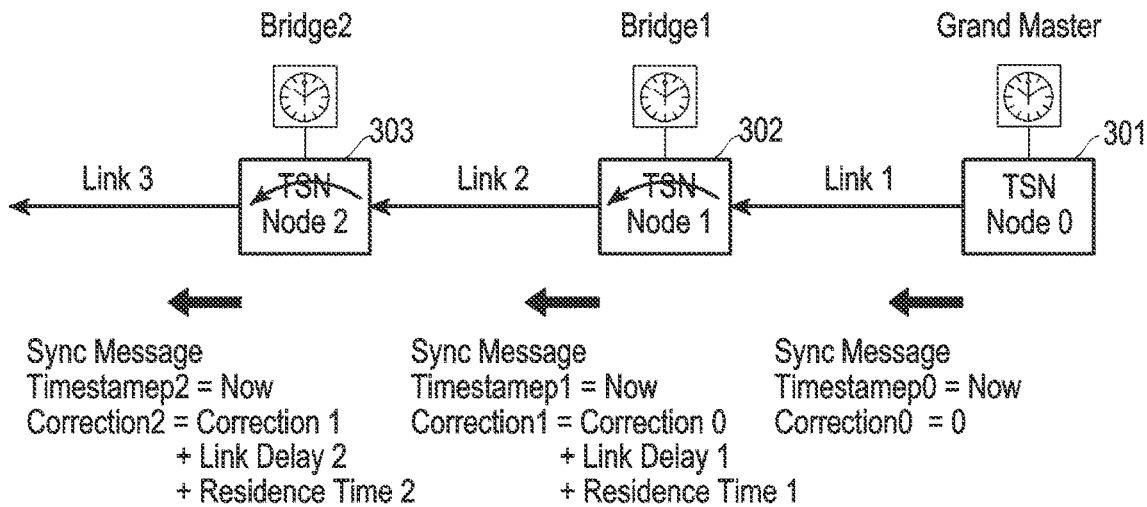
FIG. 3 illustrates the principle of time synchronization on ethernet of a legacy TSN according to an embodiment of the disclosure.

FIG. 3 illustrates the principle of time synchronization on ethernet of a legacy TSN according to an embodiment of the disclosure.

Referring to FIG. 3, nodes (TSN Node0 301, TSN Node1 302, and TSN Node2 303) of a TSN determine a reference grand master (GM). TSN Node0 301, which uses the GM as a clock source, records the current time of the GM in a Timestamp field and fills the Correction field with 0's, generating a Sync Message 0. TSN Node0 301 transmits the generated Sync Message 0 to the next node, TSN Node1 302. TSN Node 1 302 generates Sync Message 1 resultant from updating the correction field considering Link Delay 1 which is the time taken to receive Sync Message 0 (time delay in Link 1) and Residence Time 1 which is the time spent in TSN Node1 302. TSN Node1 302 transmits the generated Sync Message 1 to the next node, TS Node2 303. TSN Node2 303 generates Sync Message 2 resultant from updating the correction field considering Link Delay 2 which is the time taken to receive Sync Message 1 (time delay in Link 2) and Residence Time 2 which is the time spent in TSN Node2 303. TSN Node2 303 transmits the generated Sync Message 2 to the next node. In this way, each node periodically measures the delay time for the link with the previous node, calculates the average, specifies its spent time, updates the synchronization message, and then transmits the synchronization message to the next node.

Figure 4:
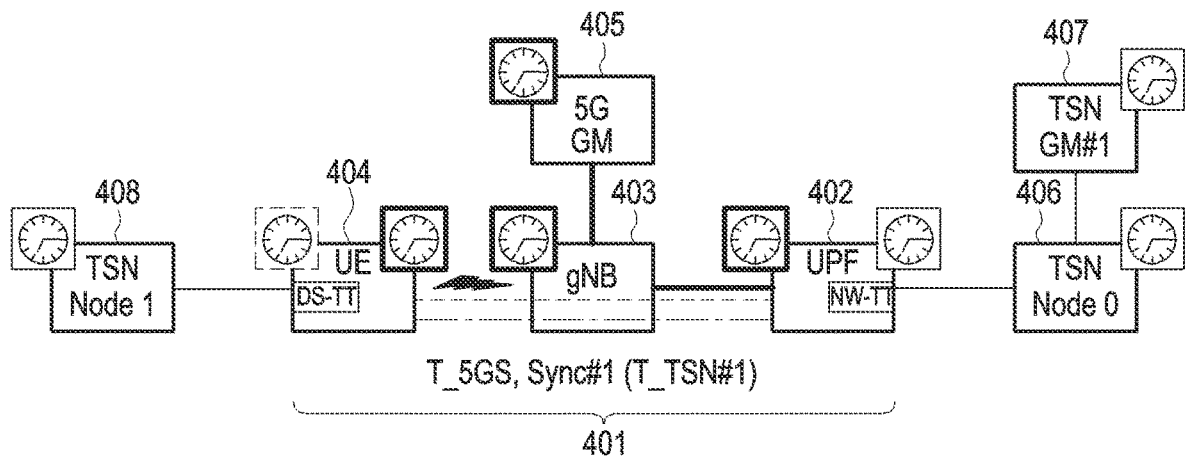
FIG. 4 illustrates a 5G network supporting TSN time synchronization according to an embodiment of the disclosure.

FIG. 4 illustrates a 5G network supporting TSN time synchronization according to an embodiment of the disclosure. FIG. 4 illustrates a result of modeling a 5G network with TSN bridges (or TSN nodes) as illustrated in FIG. 3.

Referring to FIG. 4, UPF 402, gNB 403, UE 404, which is a 5G network 401, as a single TSN node, supports the TSN by updating the synchronization message through calibration of the link delay and the residence time. To that end, it is assumed that the UPF/NW-TT 402, gNB 403, and UE/DS-TT 404 inside the 5G network 401 are synchronized to a common 5G GM 405. For example, the gNB 403 is connected to the GPS, the UPF/NW-TT 402 is connected to the gNB 403 through an ethernet-based TSN to synchronize with the gNB 403, and the UE 404 may be synchronized with the gNB 403 through a process of transmitting and receiving PHY frames. The UPF/NW-TT 402 may be connected to the TSN node of the wired network, and the UE/DS-TT 404 may also be connected to the TSN node of the wired network.

Referring to FIG. 4, since TSN GM1 407, which is a GM of the TSN, exists in TSN node 0 406 connected to the UPF/NW-TT 402, the UPF/NW-TT 402 receives a synchronization message from TSN node 0 406. The UPF/NW-TT 402 records the time of reception from TSN node 0 406 with respect to the 5G GM 405 as the Ingress Time of the packet. The UPF/NW-TT 402 periodically calculates and manages a Link Delay, which is the link delay time with TSN node 0 406. The UPF/NW-TT 402 transmits a synchronization message including the Ingress Time and Link Delay to the UE/DS-TT 404. The UE/DS-TT 404 calculates the Link Delay, which is the link delay time with TSN node 1 408, and calculates the Residence Time, which is the time spent in the 5G network 401, with respect to the time of the 5G GM. The UE/DS-TT 404 updates the correction field of the synchronization message using the calculated Residence Time and Link Delay and transmits the updated synchronization message to the next TSN node, TSN node 1 407. TT denotes a logical block that connects TSN and 3GPP and may have a port connected to the outside when the 5G network is modeled with TSN bridges, which are a single TSN node, and may be actually implemented to be integrated with or separated from the UPF (in the case of NW-TT) or the UE (in the case of DS-TT).

As various new requirements emerge, such as network configuration among wireless UEs in venues or sports stadiums, and wirelessization in factories, the need for UEs or networks themselves to be used as GMs of a time sensitive network (TSN) arises. However, according to the current 3GPP standards, the 5G network cannot support the case where a GM is located in such a UE or a 5G core network or a base station operates as a GM. As a representative cause, only packet processing in the downward direction from NW-TT to DS-TT is supported, and when the UE or 5G core network becomes a GM, the transmission direction of the time synchronization packet cannot be determined. Accordingly, a forwarding rule related to packet transmission needs to be set to transmit PTP or gPTP packets containing time synchronization information even in such a case.

As another requirement, most of general applications and services are based on IP-based network communications. The IEEE TSN network-related technology described above operates based on ethernet and cannot support traffic generated from general IP-based services and applications. Therefore, to overcome these limitations, requirements as to whether to support time sensitive traffic through general AFs, not TSN AFs, to handle time sensitive traffic and targeting general data networks, not networks supporting the TSN in external networks, are surfacing. It is also required to provide time sensitive traffic between UEs connected to the mobile communication network by going beyond supporting only communication with external data networks of the related art. When a general data network is used, an own time synchronization-related operation method may be used or the PTP message may be encapsulated and transmitted in the packet using a general Internet protocol, such as UDP/IP. In such a case, the legacy TSN network cannot distinguish between traffic for time sensitive communication and other normal data traffic and, thus, the same service quality is applied thereto, and cannot support the network features required for the TSN. Some embodiments of the disclosure include a method for meeting the requirements related to time sensitive communication over such a general network.

Information exchange and control signal exchange between the above-described entities use procedures, interfaces, and protocols as defined in the 3GPP standards. However, all of the terms used in the disclosure are not limited to the terms specified in the 3GPP standards, and may be equally applied to systems and devices conforming to other standards. The description of embodiments of the disclosure focuses primarily on 3GPP communication standards, but the subject matter of the disclosure may also be applicable to other communication systems with a similar technical background with minor changes without significantly departing from the scope of the disclosure, and this may be so performed by the determination of those skilled in the art to which the disclosure pertains.

To share the same time information among the devices constituting the TSN, the PTP or gPTP protocol is used as a method for correcting delay, jitter, or each device clock that is caused during communication between the devices using the PTP protocol. In the disclosure, the description focuses on gPTP, and the same method may be applied to PTP. The gPTP protocol is a protocol that operates based on IEEE 802.1 MAC, and defines messages and procedures for time synchronization between networks constituting the TSN.

To properly perform the time synchronization method using gPTP, it is first needed to select an optimal (best) clock serving as a reference clock from among the devices constituting the TSN network. The method for selecting such a reference clock is called a best master clock algorithm (BMCA) and is specified in IEEE 802.1AS. The devices configuring the TSN transmit an Announce message for each port periodically or when a specific event, e.g., timeout, occurs. The Announce message may include information about the port to which the message was transmitted and may include currentUtcOffset, grandmasterPriority1, grandmasterClockQuality, grandmasterPriority2, grandmasterIdentity, stepsRemoved, timeSource, and Path trace TLV. The information may be used as criteria for selecting a GM, and as a method for selecting a GM that provides better quality of time information using each factor, the method described in IEEE 802.1AS may be adopted.

When an Announce message is received from a specific port, the network device identifies whether it provides a better quality of time information than the current GM using the port information included in the message per port and, upon determining that it provides a better quality of time information, updates the reference time information of the device and reassigns roles of the ports. The port roles may include master (M), slave (S), passive (P), and disabled (D). Master port refers to a port that transmits the time of the current system or device. Slave port refers to a port that needs to follow the time synchronization signal coming through the port. Disabled port refers to a port that is not used according to the configuration or for some certain reasons. Passive port refer to a port that does not correspond to the above-described port roles. Configuring the role of each device per port using such BMCA is referred to as master-slave hierarchy.

When the GM1 407 is located outside the 5G network 401 as illustrated in FIG. 4, the synchronization signal coming from the data network (DN) is a signal coming from the GM1 407, so that the port of the NW-TT 402 located on the DN side serves as S, and the port of UE/DS-TT 404 transmitting the synchronization information to the slave serves as M.

An issue with interworking with the IEEE standards in using the BMCA in the 5G network is that reception and retransmission of a BMCA-related message is not currently supported. Further, there is no clear assignment of a role to the node capable of processing the Announce message received by each port in processing the BMCA.

The disclosure includes a BMCA supporting method that adopts a control plane-based centralized information processing scheme which may perform the BMCA protocol defined in the IEEE 802.1AS standard on the 5G network in a similar manner. Currently, entities playing a role in the 5G core network to support the TSN may include the DS-TT, NW-TT, SMF, PCF, and TSN AF.

Figure 5:
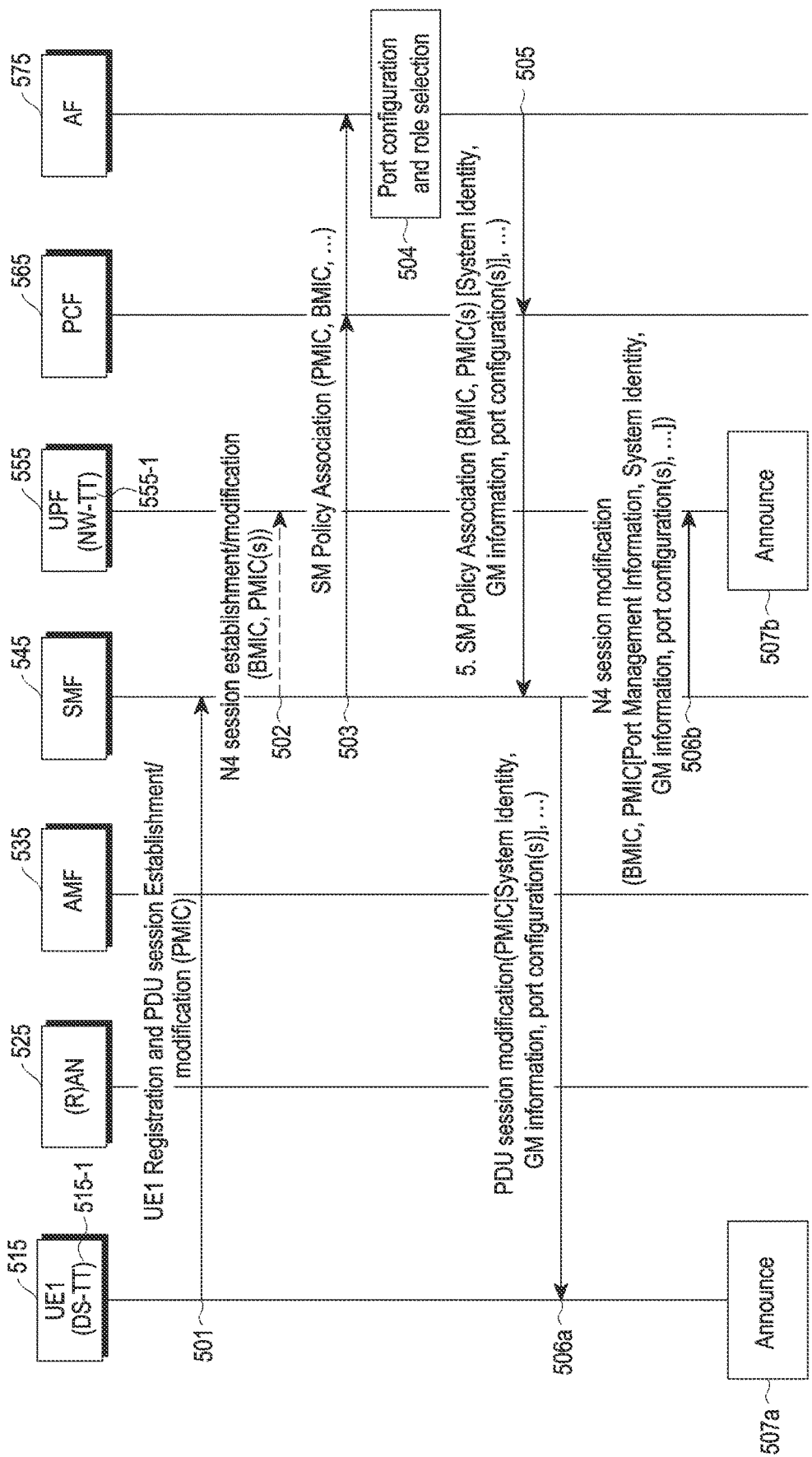
FIG. 5 illustrates a procedure for configuring a DS-TT and NW-TT in a 5G network system according to an embodiment of the disclosure.

FIG. 5 illustrates a procedure for configuring a DS-TT and NW-TT in a 5G network system according to an embodiment of the disclosure.

Referring to FIG. 5, in operation 501, a UE 515 (UE/DS-TT) having the DS-TT function to configure the TSN registers in the 5G network and then requests the SMF 545 to establish a PDU session using the data network name (DNN) and single network slice selection assistance information (S-NSSAI) allocated to a specific TSN to exchange TSN-related information. In this case, if the UE 515 already has a related PDU session, a modification procedure may be performed. For example, port management information container (PMIC) of the DS-TT 515-1 may be delivered to the SMF 545. FIG. 5 further illustrates a (R)AN 525 and AMF 535.

Optionally, if the PDU session is the first PDU session of the bridge in operation 502, the SMF 545 generates an N4 rule from the UPF 555, and may then gather the bridge management information container (BMIC) and the PMICs of the ports located in the NW-TT 555-1 together.

In operation 503, the SMF 545 reports the request for establishing or changing the PDU session received in operation 501 and the PMIC information to a corresponding PCF 565. For example, the SMF 545 may transfer the gathered PMIC of the DS-TT 515-1 and the PMICs and BMIC gathered from the NW-TT 555-1 to the PCF 565 through the SM policy association generation or modification procedure. The PCF 565 transfers TSN-related information, such as BMIC and PMIC, to the TSN AF 575. In this process, information may be delivered through the NEF. The related procedure follows the TSN related procedure of 3GPP.

In operation 504, the TSN AF 575 identifies the port and configuration information for the bridge provided in the current combination of S-NSSAI and DNN with the combination of the BMIC and PMIC information received from the PCF 565. Further, an initial role for each port may be configured. If the TSN AF 575 is aware of the system identity of the bridge in this process, this may be additionally delivered to each port to be used to perform BMCA-related tasks. The TSN AF 575 may receive the system identity, bridge, and per-port configuration information from the CNC or an external manager. The system identity may include priority 1, clockClass, clockAccuracy, offsetScaleLogVariance, priority2, or clockIdentity as defined in IEEE 802.1AS. Further, there may further be included information about whether to send an Announce message through each port (Announce Enabled), Announce interval, port role, and Announce message waiting time (timeout). In this case, instead of the system identity, a PortPriorityVector used for actual calculation may be sent. PortPriorityVector may be composed of a combination of rootSystemIdentity, stepsRemoved, sourcePortIdentity, and PortNumber. The port-related information, except for bridge configuration information, may be transmitted using a data structure that may be distinguished for each port. When there is a GM currently used by the selected system, the information used in the IEEE 802.1AS port priority selection process, such as Grandmaster present, Grand Master Priority, or StepsRemoved, may be included in the GM information.

In operation 505, the TSN AF 575 contains information, such as the bridge, port configuration information, system identity, and Announce Interval determined in operation 504, in the PMIC and BMIC and delivers the information to the PCF 565. The PCF 565 selects necessary information and transmits it to the SMF 545. In this process, information may be delivered using an SM policy association modification procedure.

In operations 506a and 506b, the SMF 545 identifies the related configuration information for the BMIC and PMIC and then transmits the information to the UPF 555 performing the corresponding port or bridge function and the UE 515 performing the DS-TT function. According to the 3GPP standard, an N4 session modification procedure may be used for delivery to the UPF 555 (operation 506a), and the information received from the PCF 565 may be transferred to the UE 515 performing the DS-TT 515-1 through a PDS session modification procedure (operation 506b). Each procedure may be performed separately. Through the configuration up to operation 506, the DS-TT 515-1 and the NW-TT 555-1 operate as some ports of the TSN network.

In operations 507a and 507b, the ports receiving the port configuration information and system identity may store the configuration information and may thus transmit an Announce message. In operation 507a, the DS-TT 515-1 transmits an Announce message and, in operation 507b, the NW-TT 555-1 transmits an Announce message. In this case, the Announce messages transmitted from the DS-TT 515-1 and the NW-TT 555-1 include, e.g., the current system identity and the priority for synchronized GMs.

According to an embodiment, the DS-TT may transmit an Announce message to TSN devices connected to the port. Further, the DS-TT may receive an Announce message from a device connected to the link. The disclosure includes a method for allowing for similar operations to those defined in IEEE 802.1AS when the DS-TT 515-1 receives an Announce message.

Figure 6:
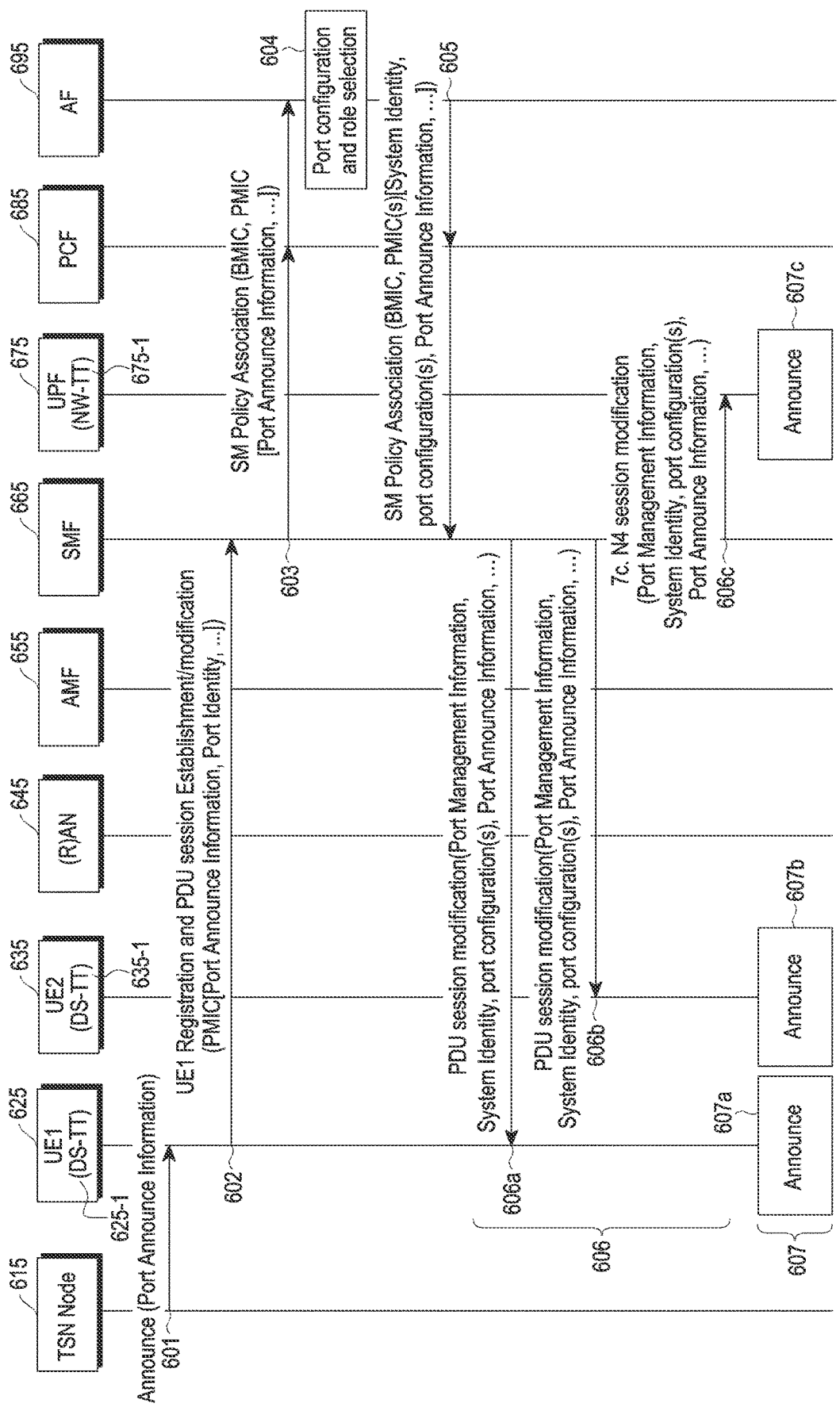
FIG. 6 illustrates a procedure for processing an Announce message received from a DS-TT by applying a control plane-based centralized information processing scheme in a 5G network system according to an embodiment of the disclosure.

FIG. 6 illustrates a procedure for processing an Announce message received from a DS-TT by applying a control plane-based centralized information processing scheme in a 5G network system according to an embodiment of the disclosure.

Referring to FIG. 6, in operation 601, the DS-TT 625-1 in UE1 625 supporting TSN using 5GC receives an Announce message from an external TSN device 615 (or node) through a link of a connected port. In this case, the received Announce message may include Port Announce Information.

In operation 602, upon receiving the Announce message from the external TSN device 615, the DS-TT 625-1 transmits the PMIC to the SMF 665 using a PDU session modification procedure. In this case, the PMIC includes the identifier information for the port to be reported and the received Announce message.

In operation 603, the SMF 665 transfers the information for the UPF 675 and DS-TTs 625-1 and 635-1 for supporting TSN in UE2 635 to the TSN AF 695 via the PCF 685. In this case, the procedure of the TSN-related standard of 3GPP may be followed. For example, the SMF 665 may transfer the gathered PMIC received from the DS-TT 625-1 and the PMICs and BMICs gathered in the NW-TT 675-1 to the PCF 685 through an SM policy association generation or modification procedure.

In operation 604, the TSN AF 695 obtains Port Announce Information through the Announce message received from the DS-TT 625-1. In this case, the TSN AF 695 may identify whether the external network connected to the port changes through the Port Announce Information. If the TSN AF 695 discovers a GM that provides a better quality of time information than the existing GM through Port Announce information, or when the existing GM times out, the TSN AF 695 may modify the GM-related configuration of the bridge of the port that has reported the Port announce information and reassign the role of each port. For the case where the existing GM times out, the TSN AF 695 retains its own timer and, upon failing to an Announce message from a specific port within a specific time, omits operations 601 to 603 while performing operation 604. The TSN AF 618 may generate an Announce message to be delivered for each port. In this case, the newly created Announce message needs to include information for the newly selected GM and needs to notify all the ports connected with the bridge, as well as the port having reported the Announce message that the GM has been updated.

In operation 605, the TSN AF 695 contains the bridge configuration information, per-port configuration information, and per-port Announce message generated in operation 604 in the PMIC and the BMIC and transfer the same to the SMF 665. In this case, the information may be transferred to the SMF 665 through the NEF and PCF 685 in a container form. In this process, the information may be delivered using an SM policy association modification procedure.

In operations 606, the SMF 665 identifies the BMIC and PMIC related configuration information received in operation 605 and then transfers the information contained in the BMIC and PMIC for each port of the DS-TTs 625-1 and 635-1 and the NW-TT 675-1. According to the 3GPP standard, the SMF 665 may deliver the received information to each of the DS-TT 625-1 and DS-TT 635-1 using a PDU session modification procedure (operation 606a and operation 606b). Further, the SMF 665 may deliver the received information to the NW-TT 675-1 using an N4 session modification procedure (operation 606c).

In operation 607, the ports 625-1, 635-1, and 675-1 receiving the port configuration information and system identity may store the configuration information and may thus transmit an Announce message. In operation 607a, the DS-TT 625-1 transmits an Announce message. In operation 607b, the DS-TT 635-1 transmits an Announce message. In operation 607c, the NW-TT 675-1 transmits an Announce message. In this case, the Announce messages transmitted from the DS-TT 635-1 and the NW-TT 675-1 include, e.g., the current system identity and the priority for synchronized GMs.

Additionally, upon receiving the Announce message from the port located in the NW-TT 675-1 in operations 601 and 602, the NW-TT 675-1 transfers the PMIC including the identification information for the port to be reported and the received Announce message to the SMF 665 using an N4 session modification procedure, not the PDU session modification.

Meanwhile, receiving and processing the Announce messages received from all the ports by the TSN AF and processing and receiving all messages to be transferred from the ports to the outside may cause lots of signaling in the control plane of the 5G system. To address these issues, embodiments of the disclosure include a method for selecting and processing only necessary Announce messages. When each port receives the Announce message from the outside, the Announce message is transferred to the TSN AF only when such an event occurs where a GM with a higher priority than the existing GM is newly generated or when the priority of the existing GM changes or disappears. This may reduce the number of times of signaling to the TSN AF.

The system further includes (R)AN 645 and AMF 655.

Figure 7:
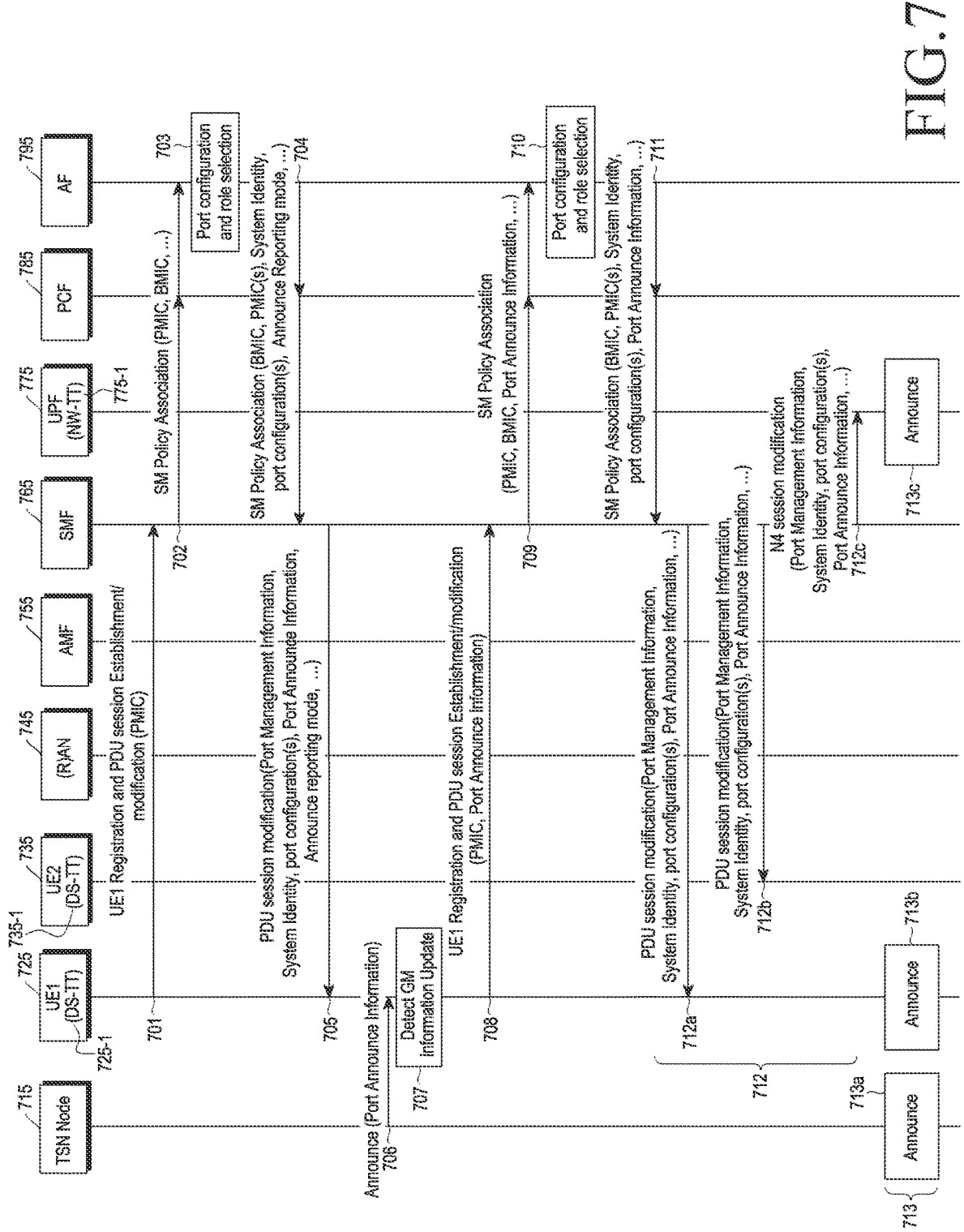
FIG. 7 illustrates a procedure for effectively processing an Announce message received from a DS-TT by applying a control plane-based centralized information processing scheme in a 5G network system according to an embodiment of the disclosure.

FIG. 7 illustrates a procedure for processing an Announce message received from a DS-TT by applying a control plane-based centralized information processing scheme in a 5G network system according to an embodiment of the disclosure.

Referring to FIG. 7, in operation 701, a UE 725 (UE/DS-TT) having the DS-TT function to configure the TSN registers in the 5G network and then requests the SMF 765 to establish a PDU session using the data network name (DNN) and single network slice selection assistance information (S-NSSAI) allocated to a specific TSN to exchange TSN-related information. In this case, if the UE 725 already has a related PDU session, a modification procedure may be performed. The UE 725 may transmit the PMIC of the DS-TT 725-1 to the SMF 765.

In operation 702, the SMF 765 reports the request for establishing or changing the PDU session received in operation 701 and the PMIC information to a corresponding PCF 785. The SMF 765 may transfer the gathered PMIC of the DS-TT 725-1 and the PMICs and BMIC gathered from the NW-TT 727-1 to the PCF 785 through the SM policy association generation or modification procedure. The PCF 785 transfers TSN-related information, such as BMIC and PMIC, to the TSN AF 795. In this process, information may be delivered through the NEF. The related procedure follows the TSN related procedure of 3GPP. In this case, if the PDU session is the first PDU session of the bridge, the SMF 765 generates an N4 rule from the UPF 775, and may then gather the BMIC and the PMICs of the ports located in the NW-TT 775-1 together.

In operation 704, the TSN AF 795 identifies the port and configuration information for the bridge provided in the current combination of S-NSSAI and DNN with the combination of the BMIC and PMIC information received from the PCF 785. Further, an initial role for each port may be configured. If the TSN AF 795 is aware of the system identity of the bridge in this process, this may be additionally delivered to each port to be used to perform BMCA-related tasks. The TSN AF 795 may receive the system identity, bridge, and per-port configuration information from the CNC or an external manager. The system identity may include priority 1, clockClass, clockAccuracy, offsetScaleLogVariance, priority2, or clockIdentity as defined in IEEE 802.1AS. Further, there may further be included information about whether to send an Announce message through each port (Announce Enabled), Announce interval, port role, and Announce message waiting time (timeout). In this case, instead of the system identity, a PortPriorityVector used for actual calculation may be sent. PortPriorityVector may be composed of a combination of rootSystemIdentity, stepsRemoved, sourcePortIdentity, and PortNumber. The port-related information, except for bridge configuration information, may be transmitted using a data structure that may be distinguished for each port. When there is a GM currently used by the system, the information used in the IEEE 802.1AS port priority selection process, such as Grandmaster present, Grand Master Priority, or StepsRemoved, may be included in the GM information. Additionally, the TSN AF 795 may configure reporting conditions for the Announce message of each port. For example, the TSN AF 795 may make a configuration to report the Announce message to the TSN AF 795 when the Announce message received by each port reports for a GM having a higher priority than the GM of the existing system, when no Announce message is received during a specific time, or when an event where the priority of the GM of the existing system is changed is detected by the port of the DS-TT or the NW-TT. The TSN AF 795 includes the reporting conditions in an Announce Reporting mode and transfers the same.

In operation 704, the TSN AF 795 contains information, such as the bridge, port configuration information, system identity, Announce Interval, or Announce Reporting mode, determined in operation 703, in the PMIC and BMIC and delivers the information to the PCF 785. The PCF 785 selects necessary information and transmits it to the SMF 765. In this process, information may be delivered using an SM policy association modification procedure.

In operation 705, the SMF 765 identifies the BMIC and PMIC related configuration information received in operation 704 and then transfers the information contained in the BMIC and PMIC for each port of the DS-TT 725-1 and the NW-TT 775-1. According to the 3GPP standard, the SMF 765 may deliver the received information using a PDU session modification procedure. Through the configuration up to operation 705, the DS-TT 725-1 operates as some ports of the TSN network.

In operation 706, the DS-TT 725-1 receives an Announce message from an external TSN device 715 or a bridge through a link of a connected port.

In operation 707, the DS-TT 725-1 identifies whether the reporting conditions of the Announce message are met according to the Announce Reporting mode received in operation 705. In other words, the DS-TT 725-1 identifies whether the received Announce message is reporting a GM with a higher priority than the GM of the existing system, whether no Announce message is received during a specific time, and when an event where the priority of the GM of the existing system is changed is detected by the port of the DS-TT or the NW-TT. In this case, when no Announce message is not received during a specific time, a code agreed on to indicate that a timeout has occurred may be delivered.

In operation 708, when the received Announce message meets at least one of the reporting conditions, the DS-TT 725-1 transfers the received Announce message to the SMF 765 using the PMIC through a PDU session modification procedure. In this case, the PMIC may include the identifier information for the port to be reported and the received Announce message.

In operation 709, the SMF 765 may transfer the information for the UPF 775 and DS-TTs 625-1 and 635-1 for supporting TSN to the TSN AF 795 via the PCF 785. This process may follow the procedure of the TSN-related standard of 3GPP. For example, the SMF 765 may transfer the gathered PMIC received from the DS-TT 725-1 and the PMICs and BMICs gathered in the NW-TT 775-1 to the PCF 785 through an SM policy association generation or modification procedure.

In operation 710, the TSN AF 795 obtains Port Announce Information through the Announce message received from the DS-TT 725-1. In this case, the TSN AF 795 may identify whether the external network connected to the port changes through the Port Announce Information. If the TSN AF 695 discovers a GM that provides a better quality of time information than the GM of the existing system through Port Announce information, or when the existing GM times out, the TSN AF 695 may modify the GM-related configuration of the bridge of the port that has reported the Port announce information and reassign the role of each port.

For the case where the GM times out, the TSN AF 795 retains its own timer and, upon failing to an Announce message from a specific port within a specific time, omits operations 706 to 709 while performing operation 710. The TSN AF 795 generates an Announce message to be delivered for each port. In this case, the newly created Announce message needs to include information for the newly selected GM and needs to notify all the ports connected with the bridge, as well as the port having reported the Announce message that the GM has been updated.

In operation 711, the TSN AF 795 contains the bridge configuration information, per-port configuration information, and per-port Announce message generated in operation 710 in the PMIC and the BMIC and transfer the same to the SMF 765. In this case, the information may be transferred to the SMF 765 through the NEF and PCF 785 in a container form. As an example, information may be delivered using an SM policy association modification procedure.

In operation 712, the SMF 765 identifies the BMIC and PMIC related configuration information received in operation 711 and then transfers the information contained in the BMIC and PMIC for each port of the DS-TTs 725-1 and 735-1 and the NW-TT 775-1. According to the 3GPP standard, the SMF 765 may deliver the received information to each of the DS-TT 725-1 and DS-TT 735-1 using a PDU session modification procedure (operation 712*a* and operation 712*b*). Further, the SMF 765 may deliver the received information to the NW-TT 775-1 using an N4 session modification procedure (operation 712c).

In operation 713, the ports 725-1, 735-1, and 775-1 receiving the port configuration information and system identity may store the configuration information and may thus transmit an Announce message. In operation 713a, the DS-TT 725-1 transmits an Announce message. In operation 713b, the DS-TT 735-1 of UE2 735 transmits an Announce message. In operation 713c, the NW-TT 775-1 transmits an Announce message. In this case, the Announce messages transmitted from the DS-TT 735-1 and the NW-TT 775-1 include, e.g., the current system identity and the priority for synchronized GMs.

The system further includes (R)AN 745 and AMF 755.

Figure 8:
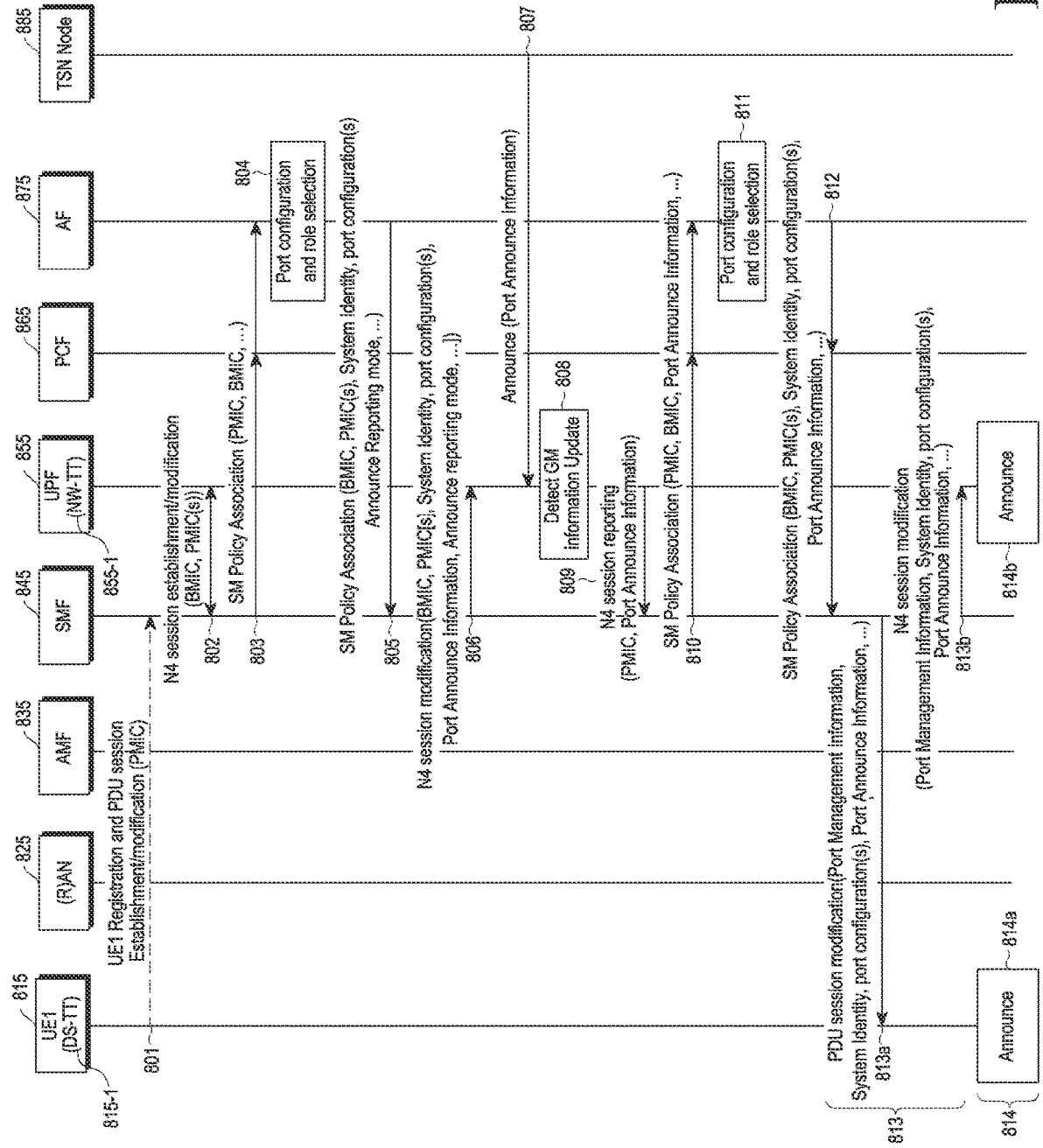
FIG. 8 illustrates a procedure in which an NW-TT effectively processes an Announce message by applying a control plane-based centralized information processing scheme in a 5G network system according to an embodiment of the disclosure.

FIG. 8 illustrates a procedure in which an NW-TT effectively processes an Announce message by applying a control plane-based centralized information processing scheme in a 5G network system according to an embodiment of the disclosure.

Referring to FIG. 8, in operation 801 (upon initial TSN configuration), a UE 815 (UE/DS-TT) having the DS-TT function to configure the TSN registers in the 5G network and then requests the SMF 845 to establish a PDU session using the data network name (DNN) and single network slice selection assistance information (S-NSSAI) allocated to a specific TSN to exchange TSN-related information. In this case, if the UE 815 already has a related PDU session, a modification procedure may be performed. The UE 815 may transmit the PMIC of the DS-TT 815-1 to the SMF.

If there is a request to establish a PDU session for TSN in operation 802, the UPF 855 processing the corresponding NW-TT 855-1 transfers the information for the BMIC and PMICs to the SMF 845 through an N4 session-related procedure according to the 3GPP standard.

In operation 803, the SMF 845 reports the request for establishing or changing the PDU session and N4 session and the BMIC and PMIC information to a corresponding PCF 865. The SMF 845 may transfer the gathered PMIC of the DS-TT 815-1 and the PMICs and BMIC gathered from the NW-TT 855-1 to the PCF 865 through the SM policy association generation or modification procedure. The PCF 865 transfers TSN-related information, such as BMIC and PMIC, to the TSN AF 875. In this process, information may be delivered through the NEF. The related procedure follows the TSN related procedure of 3GPP.

In operation 804, the TSN AF 875 identifies the port and configuration information for the bridge provided in the current combination of S-NSSAI and DNN with the combination of the BMIC and PMIC information received from the PCF 865. Further, an initial role for each port may be configured. If the TSN AF 875 is aware of the system identity of the bridge in this process, this may be additionally delivered to each port to be used to perform BMCA-related tasks. The TSN AF 875 may receive the system identity, bridge, and per-port configuration information from the CNC or an external manager. The system identity may include priority 1, clockClass, clockAccuracy, offsetScaleLogVariance, priority2, or clockIdentity as defined in IEEE 802.1AS. Further, there may further be included information about whether to send an Announce message through each port (Announce Enabled), Announce interval, port role, and Announce message waiting time (timeout). During this course, instead of the system identity, a PortPriorityVector used for actual calculation may be sent. PortPriorityVector may be composed of a combination of rootSystemIdentity, stepsRemoved, sourcePortIdentity, and PortNumber. The port-related information, except for bridge configuration information, may be transmitted using a data structure that may be distinguished for each port. When there is a GM currently used by the selected system, the information used in the IEEE 802.1AS port priority selection process, such as Grandmaster present, Grand Master Priority, or StepsRemoved, may be included in the GM information. Additionally, the TSN AF 875 may configure reporting conditions for the Announce message of each port. For example, the TSN AF 875 may make a configuration to report the Announce message to the TSN AF 875 when the Announce message received by each port reports for a GM having a higher priority than the GM of the existing system, when no Announce message is received during a specific time, or when an event where the priority of the GM of the existing system is changed is detected by the port of the DS-TT or the NW-TT. The TSN AF 875 includes the reporting conditions in an Announce Reporting mode and transfers the same.

In operation 805, the TSN AF 875 contains information, such as the bridge, port configuration information, system identity, Announce Interval, or Announce Reporting mode, determined in operation 804, in the PMIC and BMIC and delivers the information to the PCF 865. The PCF 865 selects necessary information and transmits it to the SMF 845. In this process, information may be delivered using an SM policy association modification procedure.

In operation 806, the SMF 845 identifies the BMIC and PMIC related configuration information received in operation 805 and then transfers the information contained in the BMIC and PMIC for each port of the DS-TT 815-1 and the NW-TT 855-1. According to the 3GPP standard, the SMF 845 may deliver the received information using an N4 session-related procedure. Through the configuration up to operation 806, the NW-TT 855-1 operates as some ports of the TSN network.

In operation 807, the NW-TT 855-1 receives an Announce message from an external TSN device 885 or a bridge through a link of a connected port.

In operation 808, the NW-TT 855-1 identifies whether the reporting conditions of the Announce message are met according to the Announce Reporting mode received in operation 806. In other words, the NW-TT 855-1 identifies whether the received Announce message is reporting a GM with a higher priority than the GM of the existing system, whether no Announce message is received during a specific time, and when an event where the priority of the GM of the existing system is changed is detected by the port of the DS-TT or the NW-TT. In this case, when no Announce message is not received during a specific time, a code agreed on to indicate that there is no information and a timeout has occurred may be delivered.

In operation 809, when the received Announce message meets at least one of the reporting conditions, the NW-TT 855-1 transfers the received Announce message to the SMF 845 using the PMIC through an N4 session reporting procedure. In this case, the PMIC may include the identifier information for the port to be reported and the received Announce message.

In operation 810, the SMF 845 may transfer the information for the UPF 855 and DS-TT 815-1 for supporting TSN to the TSN AF 875 via the PCF 865. This process may follow the procedure of the TSN-related standard of 3GPP. For example, the SMF 765 may transfer the gathered PMIC received from the DS-TT 815-1 and the PMICs and BMICs gathered in the NW-TT 855-1 to the PCF 865 through an SM policy association generation or modification procedure.

In operation 811, the TSN AF 875 obtains Port Announce Information through the Announce message received from the NW-TT 855-1. In this case, the TSN AF 875 may identify whether the external network connected to the port changes through the Port Announce Information. If the TSN AF 875 discovers a GM that provides a better quality of time information than the GM of the existing system through Port Announce information, or when the existing GM times out, the TSN AF 695 may modify the GM-related configuration of the bridge of the port that has reported the Port announce information and reassign the role of each port.

For the case where the GM times out, the TSN AF 875 retains its own timer and, upon failing to an Announce message from a specific port within a specific time, omits operations 807 to 810 while performing operation 811. The TSN AF 875 generates an Announce message to be delivered for each port. In this case, the newly created Announce message needs to include information for the newly selected GM and needs to notify all the ports connected with the bridge, as well as the port having reported the Announce message that the GM has been updated.

In operation 812, the TSN AF 875 contains the bridge configuration information, per-port configuration information, and per-port Announce message generated in operation 811 in the PMIC and the BMIC and transfer the same to the SMF 845. In this case, the information may be transferred to the SMF through the NEF and PCF in a container form. As an example, information may be delivered using an SM policy association modification procedure.

In operation 813, the SMF 845 identifies the BMIC and PMIC related configuration information received in operation 812 and then transfers the information contained in the BMIC and PMIC for each port of the DS-TT 815-1 and the NW-TT 855-1. According to the 3GPP standard, the SMF 8455 may deliver the received information to the DS-TT 715-1 using a PDU session modification procedure (operation 813a). Further, the SMF 845 may deliver the received information to the NW-TT 855-1 using an N4 session modification procedure (operation 813b).

In operation 814, the ports 815-1 and 855-1 receiving the port configuration information and system identity may store the configuration information and may thus transmit an Announce message. In operation 814a, the DS-TT 815-1 transmits an Announce message and, in operation 814b, the NW-TT 855-1 transmits an Announce message. In this case, the Announce messages transmitted from the DS-TT 815-1 and the NW-TT 855-1 include, e.g., the current system identity and the priority for synchronized GMs.

The system further includes (R)AN 825 and AMF 735.

FIG. 9 illustrates operations and results of a method for supporting a BMCA to which a control plane-based centralized information processing scheme is applied, according to an embodiment of the disclosure.

Referring to FIG. 9, in operation 901, a TSN Node0 910 outside a 5G network transmits an Announce message 0 using a GM1 910-1 as a clock source to a DS-TT1 915-1 in UE 915. In operation 902, the DS-TT1 915-1 delivers its own information to a TSN AF 965 based on the received Announce message 0 through a gNB 935, AMF 950 and PCF 960. For example, the DS-TT1 915-1 transmits the Announce message 0 received using the PMIC to the TSN AF 965 via the SMF 955 through a PDU session modification procedure. The specific procedure follows the procedures described above in connection with FIGS. 6 and 7. In operation 903, a TSN Node2 970 outside the 5G network transmits an Announce message 2 using a GM2 970-1 as a clock source to the NW-TT 945-1. In operation 904, the NW-TT 945-1 delivers its own information to the TSN AF 965 based on the received Announce message 2. For example, the NW-TT 945-1 transmits the Announce message 2 received using the PMIC to the TSN AF 965 via the SMF 955 through an N4 session reporting procedure. The specific procedure follows the procedures described above in connection with FIG. 8. In operation 905, the TSN Node 1 925 transmits an Announce message 1 including Non-GM-Capable information indicating that it does not have a clock source to the DS-TT2 920-1 in UE 915. In operation 906, the DS-TT1 920-2 contains and delivers its own information to a TSN AF 965 based on the received Announce message 1 through a gNB 940. For example, the DS-TT1 920-2 transmits the Announce message 1 received using the PMIC to the TSN AF 965 via the SMF 955 through a PDU session modification procedure. The specific procedure follows the procedures described above in connection with FIGS. 6 and 7. In operation 907, the TSN AF 965) compile the information received from DS-TT1 915-1, DS-TT2 920-1, and NW-TT 945-1 to determine a clock source in the bridge, and determines the roles of the DS-TT1 915-1, DS-TT2 920-1, and NW-TT 945-1. In this case, the port where the best master clock is located is determined according to the BMCA principle. For example, if GM1 is a clock source with a higher priority than GM2 (GM1>GM2), a signal to set DS-TT1 915-1 where GM1 is located to serve as S, the NW-TT (945-1) where GM2 is located to serve as M, and DS-TT2 920-1 where only non-GM-capable nodes are located to serve as M is transmitted to the control plane. For example, the TSN AF 965 may store configuration information for each port in the PMIC and BMIC and transmit the information to each port through the SMF 955. The specific procedure follows the procedures described above in connection with FIGS. 6 to 8.

For example, when the role of DS-TT1 915-1 is set to S, and the roles of DS-TT2 920-1 and NW-TT 945-1 are set to M, DS-TT1 915-1 transmits an Announce message according to its role in the period of transmission of the Announce message. For example, DS-TT1 915-1 increases the step field indicating the number of hops with GM2 by 1 while leaving GM2, which is the clock source, as it is, in the Announce message received from the NW-TT 945-1 and transmits the result to TSN Node0 910. Upon receiving the Announce message from DS-TT1 915-1, TSN Node0 910 is aware that its role is M and the role of DS-TT1 915-1 is S. The NW-TT 945-1 or DS-TT2 920-1 also transmit an Announce message according to their role in the transmission period of the Announce message. For example, the NW-TT 945-1 increases the step field by 1 while leaving GM1, which is the clock source, as it is in the Announce message received from DS-TT1 915-1 and transmits the result to the outside. According to the predetermined role, upon receiving the synchronization message 0 912, DS-TT1 915-1 transmits the synchronization message 0 912 to the NW-TT 945-1 and DS-TT2 920-1. The NW-TT 945 updates the correction field of the received synchronization message 912 to reflect the time spent in the 5G network (residence time) and the time (link delay) delayed in the link of the DS-TT1 915-1 and TSN Node0 910 and transmits the result as a synchronization message 1 913 to the outside. DS-TT2 920-1 also updates the correction field of the received synchronization message 912 to reflect the time spent in the 5G network (residence time) and the time (link delay) delayed in the link of DS-TT1 915-1 and TSN Node0 910 and transmits the result as a synchronization message 2 914 to the outside.

Figure 10:
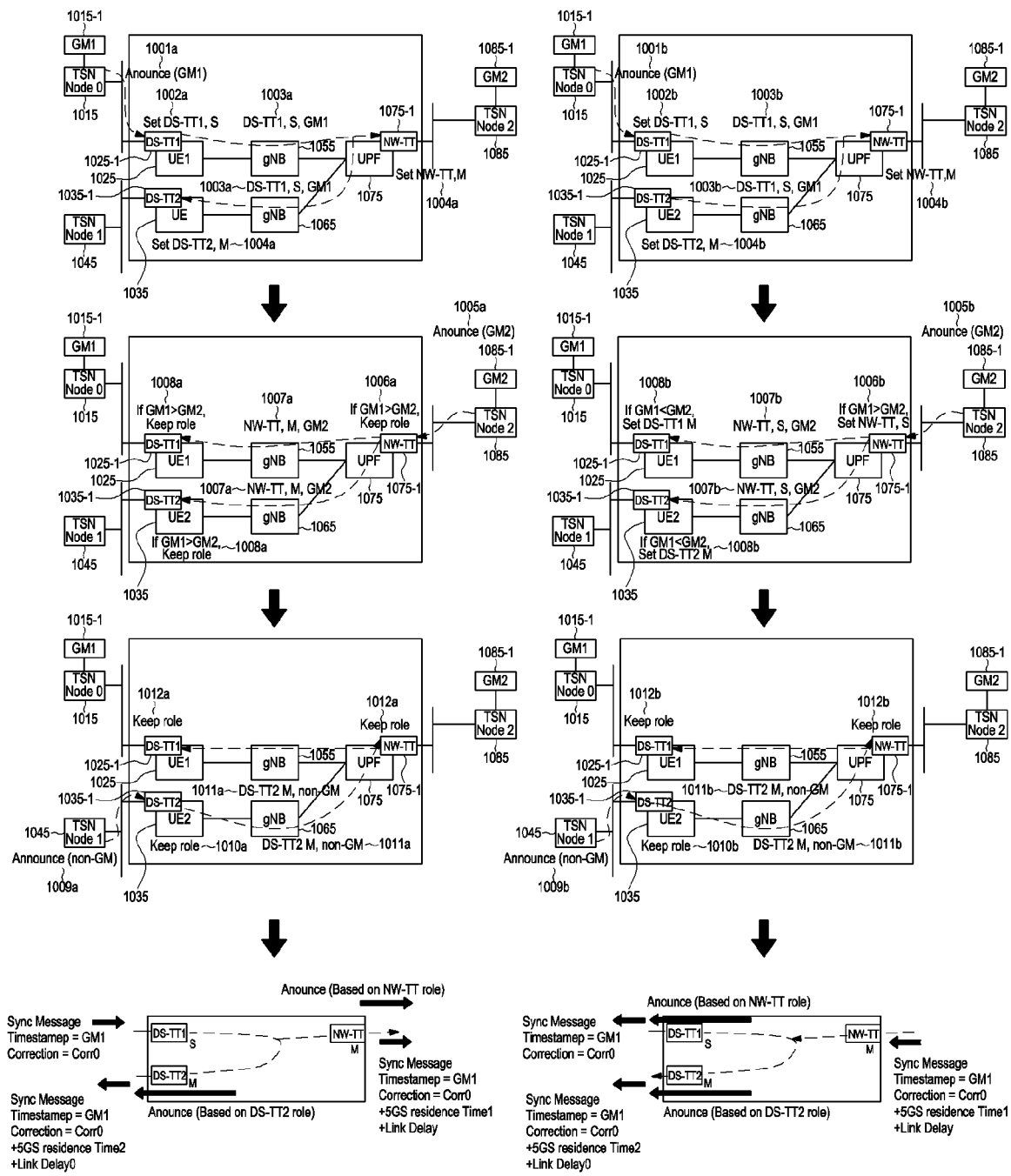
FIG. 10 illustrates operations and results of a method for supporting a BMCA to which a user plane-based distributed information processing scheme is applied, according to an embodiment of the disclosure.

FIG. 10 illustrates operations and results of a method for supporting a BMCA to which a user plane-based distributed information processing scheme is applied, according to an embodiment of the disclosure. In FIG. 10, Case 1 corresponds to an example in which the priority of GM1 is higher than that of GM2, and Case 2 corresponds to an example in which the priority of GM1 is lower than that of GM2.

Case 1

Referring to FIG. 10, in operation 1001a, a TSN Node0 1015 having a GM1 1015-1 as a clock source transmits an Announce message 0 to a DS-TT1 1025-1. In operation 1002a, DS-TT1 1025-1 in UE1 1025 temporarily sets its own role to S based on the received Announce message 0 through gNB 1055. In operation 1003a, DS-TT1 1025-1 adds information indicating that DS-TT1 1025-1 serves as S in Announce message 0 and broadcasts it to the NW-TT 1075-1 and DS-TT2 1035-1 from UE 1035 through gNB 1065. In operation 1004a, upon receiving the Announce message 0 from DS-TT1 1025-1, the NW-TT 1075-1 in UPF 1075 sets its role to M. Likewise, in operation 1004a, upon receiving the Announce message 0 from DS-TT1 1025-1, DS-TT1 1025-1 sets its role to M.

In operation 1005a, a TSN Node2 1085 having a GM2 1085-1 as a clock source transmits an Announce message 2 to the NW-TT1 1075-1. In operation 1006a, the NW-TT1 1075-1 determines whether to update its role based on the received Announce message 2. In other words, the NW-TT 1075-1 compares the priority of GM1 1015-1 for Announce message 0 with the priority of GM2 1085-1 for Announce message 2. As a result of the comparison, since the priority of GM1 1015-1 is higher than that of GM2 1085-1, the NW-TT 1075-1 maintains the role as M as previously set. In operation 1007a, DS-TT1 1025-1 adds information indicating that the NW-TT 1075-1 serves as M in Announce message 2 and broadcasts it to DS-TT1 1025-1 and DS-TT2 1035-1. In operation 1008a, upon receiving Announce message 2, DS-TT1 1025-1 compares the priority of GM1 1015-1 for Announce message 0 with the priority of GM2 1085-1 for Announce message 2. Since the priority of GM1 1015-1 is higher than that of GM2 1085-1, DS-TT1 1025-1 maintains its role as S. Likewise, in operation 1008a, upon receiving the Announce message 2 from the NW-TT 1075-1, DS-TT2 1035-1 maintains its role as M.

In operation 1009a, a TSN Node2 1045 having no clock source for GM transmits an Announce message 1 to DS-TT 1035-1. In operation 1010a, DS-TT2 1035-1 determines whether to update its role based on Announce message 1. Since Announce message 1 does not contain information about the GM, DS-TT2 1035-1 maintains the role as M as previously set. In operation 1011a, DS-TT2 1035-1 adds information indicating that DS-TT2 1035-1 serves as M in Announce message 1 and broadcasts it to the NW-TT 1085-1 and DS-TT1 1025-1. In operation 1012a, upon receiving Announce message 1, the NW-TT 1085-1 maintains its role as M since Announce message 2 lacks information for GM. Likewise, upon receiving the Announce message 2, DS-TT1 1025-1 maintains its role as S.

As such, when the priority of GM1 1015-1 is higher than that of GM2 1085-1 (GM1>GM2), the role of DS-TT1 1025-1 is set to S, and the roles of the NW-TT 1075-1 and DS-TT2 1035-1 are set to M, and each port transmits an Announce message to the outside according to its role and the interval timer of the Announce message. In this case, DS-TT1 1025-1 serving as S transmits no Announce message to the outside. Further, transmission of a synchronization message within the 5G network is performed from DS-TT1 1025-1, which serves as S, to the NW-TT 1075-1 and DS-TT2 1035-1, which serve as M's. The specific procedure follows the procedures described above in connection with FIG. 9.

Case 2

Referring to FIG. 10, in operation 1001b, TSN Node0 1015 having GM1 1015-1 as a clock source transmits Announce message 0 to DS-TT1 1025-1. In operation 1002b, DS-TT1 1025-1 temporarily sets its own role to S based on the received Announce message 0. In operation 1003b, DS-TT1 1025-1 adds information indicating that DS-TT1 serves as S in Announce message 0 and broadcasts it to the NW-TT 1075-1 and DS-TT2 1035-1. In operation 1004b, upon receiving the Announce message 0 from DS-TT1 1025-1, the NW-TT 1075-1 sets its role to M. Likewise, in operation 1004b, upon receiving the Announce message 0 from DS-TT1 1025-1, DS-TT1 1025-1 sets its role to M.

In operation 1005b, TSN Node2 1085 having GM2 1085-1 as a clock source transmits Announce message 2 to the NW-TT 1075-1. In operation 1006b, the NW-TT1 1075-1 determines whether to update its role based on the received Announce message 2. In other words, the NW-TT 1075-1 compares the priority of GM1 1015-1 for Announce message 0 with the priority of GM2 1085-1 for Announce message 2. Since the priority of GM1 1015-1 is lower than that of GM2 1085-1, NW-TT 1075-1 changes its role to S. In operation 1007b, DS-TT1 1025-1 adds information indicating that the NW-TT 1075-1 serves as S in Announce message 2 and broadcasts it to DS-TT1 1025-1 and DS-TT2 1035-1. In operation 1008b, upon receiving Announce message 2, DS-TT1 1025-1 compares the priority of GM1 1015-1 for Announce message 0 with the priority of GM2 1085-1 for Announce message 2. Since the priority of GM1 1015-1 is lower than that of GM2 1085-1, DS-TT1 1025-1 changes its role to M. Likewise, in operation 1008b, upon receiving the Announce message 2 from the NW-TT 1075-1, DS-TT2 1035-1 maintains its role as M.

In operation 1009b, TSN Node1 1045 having no clock source for GM transmits Announce message 1 to DS-TT2 1035-1. In operation 1010b, DS-TT2 1035-1 determines whether to update its role based on the Announce message 1. Since Announce message 1 does not contain information about GM, DS-TT2 1035-1 maintains its role as M as previously set. In operation 1011b, DS-TT2 1035-1 adds information indicating that DS-TT2 1035-1 serves as M in Announce message 1 and broadcasts it to the NW-TT 1075-1 and DS-TT1 1025-1. In operation 1012b, upon receiving Announce message 1, the NW-TT 1075-1 maintains its role as S since Announce message 1 lacks information for GM. Likewise, upon receiving the Announce message 1, DS-TT1 1025-1 maintains its role as M.

As such, when the priority of GM1 1015-1 is lower than that of GM2 1085-1 (GM1<GM2), the role of the NW-TT 1075-1 is set to S, and the roles of DS-TT1 1025-1 and DS-TT2 1035-1 are set to M, and each port transmits an Announce message to the outside according to its role and the interval timer of the Announce message. In this case, the NW-TT 1075-1 serving as S transmits no Announce message to the outside. Further, transmission of a synchronization message within the 5G network is performed from the NW-TT 1075-1, which serves as S, to DS-TT1 1025-1 and DS-TT2 1035-1, which serve as M's. The specific procedure follows the procedures described above in connection with FIG. 9.

Figure 11:
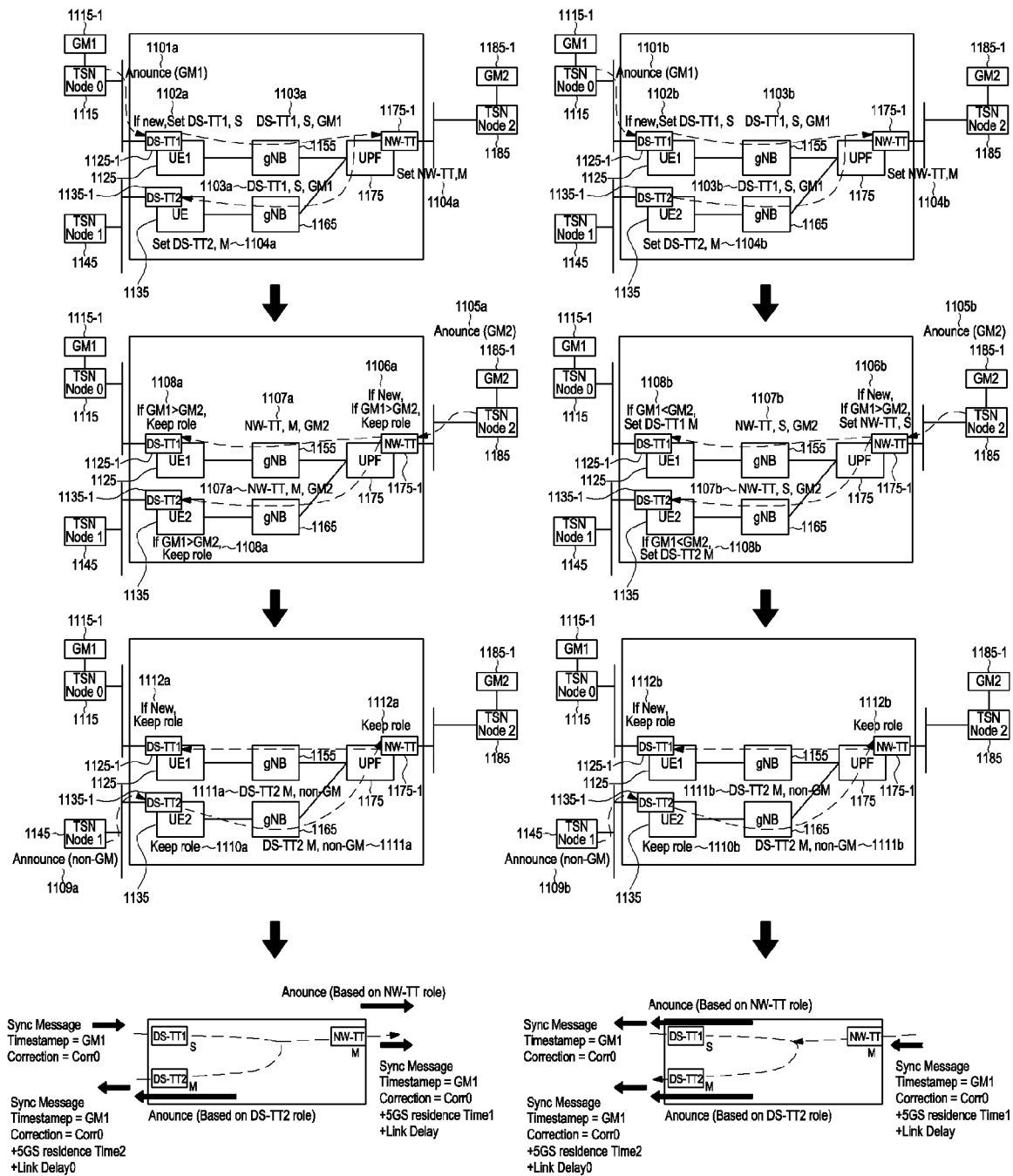
FIG. 11 illustrates operations and results of a method for supporting a BMCA to which a user plane-based distributed information processing scheme is applied, according to an embodiment of the disclosure.

FIG. 11 illustrates operations and results of a method for supporting a BMCA to which a user plane-based distributed information processing scheme is applied, according to an embodiment of the disclosure. In FIG. 11, Case 1 corresponds to an example in which the priority of GM1 is higher than that of GM2, and Case 2 corresponds to an example in which the priority of GM1 is lower than that of GM2.

Case 1

Referring to FIG. 11, in operation 1101a, a TSN Node0 1115 having GM1 1115-1 as a clock source transmits an Announce message 0 to DS-TT1 1125-1. In operation 1102a, if the received Announce message 0 differs from the Announce message received immediately before, DS-TT1 1125-1 in UE1 1125 temporarily sets its role to S based on Announce message 0 through gNB 1155. In operation 1103a, DS-TT1 1125-1 adds information indicating that DS-TT1 1125-1 serves as S in Announce message 0 and broadcasts it to the NW-TT 1175-1 and DS-TT2 1135-1 through gNB 1165. In operation 1104a, upon receiving the Announce message 0 from DS-TT1 1125-1, the NW-TT 1175-1 in UPF 1175 sets its role to M. Likewise, in operation 1104a, upon receiving the Announce message 0 from DS-TT1 1125-1, DS-TT2 1135-1 in UE 1135 sets its role to M.

In operation 1105a, TSN Node1 1185 having GM2 1185-1 as a clock source transmits Announce message 1 to the NW-TT 1175-1. In operation 1106a, if the received Announce message 1 is compared with and differs from the Announce message received immediately before, the NW-TT 1175-1 determines whether to update its role based on Announce message 1. In other words, the NW-TT 1175-1 compares the priority of GM1 1115-1 for Announce message 0 with the priority of GM2 1185-1 for Announce message 1. Since the priority of GM1 1115-1 is higher than that of GM2 1185-1, the NW-TT 1175-1 maintains the role as M as previously set. In operation 1107a, the NW-TT 1175-1 adds information indicating that the NW-TT 1175-1 serves as M in Announce message 1 and broadcasts it to DS-TT1 1125-1 and DS-TT2 1135-1. In operation 1108a, upon receiving Announce message 1, DS-TT1 1125-1 compares the priority of GM1 1115-1 with the priority of GM2 1185-1 for Announce message 1. Since the priority of GM1 1115-1 is higher than that of GM2 1185-1, DS-TT1 1125-1 maintains its role as S. Likewise, in operation 1108a, upon receiving the Announce message 1 from the NW-TT 1175-1, DS-TT2 1135-1 maintains its role as M.

In operation 1109a, a TSN Node2 1145 having no clock source for GM transmits an Announce message 2 to DS-TT2 1135-1. In operation 1110a, if the received Announce message 2 is compared with and differs from the Announce message received immediately before, DS-TT2 1135-1 determines whether to update its role based on Announce message 2. Since Announce message 2 does not contain information about the GM, DS-TT2 1135-1 maintains the role as M as previously set. In operation 1111a, DS-TT2 1135-1 adds information indicating that DS-TT2 1135-1 serves as M in Announce message 2 and broadcasts it to the NW-TT 1075-1 and DS-TT1 1125-1. In operation 1112a, upon receiving Announce message 2, the NW-TT 1175-1 maintains its role as M since Announce message 2 lacks information for GM. Likewise, in operation 1112a, upon receiving the Announce message 2, DS-TT1 1125-1 maintains its role as S.

As such, when the priority of GM1 1115-1 is higher than that of GM2 1185-1, the role of DS-TT1 1125-1 is set to S, and the roles of the NW-TT 1175-1 and DS-TT2 1135-1 are set to M, and each port transmits an Announce message to the outside according to its role and the interval timer of the Announce message. In this case, DS-TT1 1125-1 serving as S transmits no Announce message to the outside. Further, transmission of a synchronization message within the 5G network is performed from DS-TT1 1025-1, which serves as S, to the NW-TT 1175-1 and DS-TT2 1135-1, which serve as M's. The specific procedure follows the procedures described above in connection with FIG. 9.

Case 2

Referring to FIG. 11, in operation 1101b, a TSN Node0 1115 having GM1 1115-1 as a clock source transmits an Announce message 0 to DS-TT1 1125-1. In operation 1102b, if the received Announce message 0 is compared with and differs from the Announce message received immediately before, DS-TT1 1125-1 temporarily sets its role to S based on Announce message 0. In operation 1103b, DS-TT1 1125-1 adds information indicating that DS-TT1 1125-1 serves as S in Announce message 0 and broadcasts it to the NW-TT 1175-1 and DS-TT2 1135-1. In operation 1104b, upon receiving the Announce message 0 from DS-TT1 1125-1, the NW-TT 1175-1 sets its role to M (master). Likewise, in operation 1104b, upon receiving the Announce message 0 from DS-TT1 1125-1, DS-TT2 1135-1 sets its role to M.

In operation 1105b, TSN Node2 1185 having GM2 1185-1 as a clock source transmits Announce message 2 to the NW-TT 1175-1. In operation 1106b, if the received Announce message 2 is compared with and differs from the Announce message received immediately before, the NW-TT 1175-1 determines whether to update its role based on Announce message 2. In other words, the NW-TT 1175-1 compares the priority of GM1 1115-1 for Announce message 0 with the priority of GM2 1185-1 for Announce message 2. Since the priority of GM1 1115-1 is lower than that of GM2 1185-1, the NW-TT 1175-1 changes its role to S. In operation 1107b, the NW-TT 1175-1 adds information indicating that the NW-TT 1175-1 serves as S to the received Announce message 2 and broadcasts it to DS-TT1 1125-1 and DS-TT2 1135-1. In operation 1108b, upon receiving Announce message 2, DS-TT1 1125-1 compares the priority of GM1 1115-1 with the priority of GM2 1185-1 for Announce message 2. Since the priority of GM1 1115-1 is lower than that of GM2 1185-1, DS-TT1 1125-1 changes its role to M. Likewise, in operation 1108b, upon receiving the Announce message 2 from the NW-TT 1175-1, DS-TT2 1135-1 maintains its role as M.

In operation 1109b, a TSN Node1 1145 having no clock source for GM transmits an Announce message 2 to DS-TT2 1135-1. In operation 1110b, if the received Announce message 1 is compared with and differs from the Announce message received immediately before, DS-TT2 1135-1 determines whether to update its role based on Announce message 1. Since there is no GM for Announce message 1, DS-TT2 1135-1 maintains the role as M as previously set. In operation 1111b, DS-TT2 1135-1 adds information indicating that DS-TT2 1135-1 serves as M to Announce message 1 and broadcasts it to the NW-TT 1175-1 and DS-TT1 1125-1. In operation 1112b, upon receiving Announce message 1, the NW-TT 1175-1 maintains its role as S since Announce message 2 lacks information for GM. Likewise, in operation 1112b, upon receiving Announce message 1, DS-TT1 1125-1 maintains its role as M.

As such, when the priority of GM1 1015-1 is lower than that of GM2 1085-1 (GM1<GM2), the role of the NW-TT 1175-1 is set to S, and the roles of DS-TT1 1125-1 and DS-TT2 1135-1 are set to M, and each port transmits an Announce message to the outside according to its role and the interval timer of the Announce message. In this case, the NW-TT 1175-1 serving as S transmits no Announce message to the outside. Further, transmission of a synchronization message within the 5G network is performed from the NW-TT 1175-1, which serves as S, to DS-TT1 1125-1 and DS-TT2 1135-1, which serve as M's. The specific procedure follows the procedures described above in connection with FIG. 9.

Figure 12:
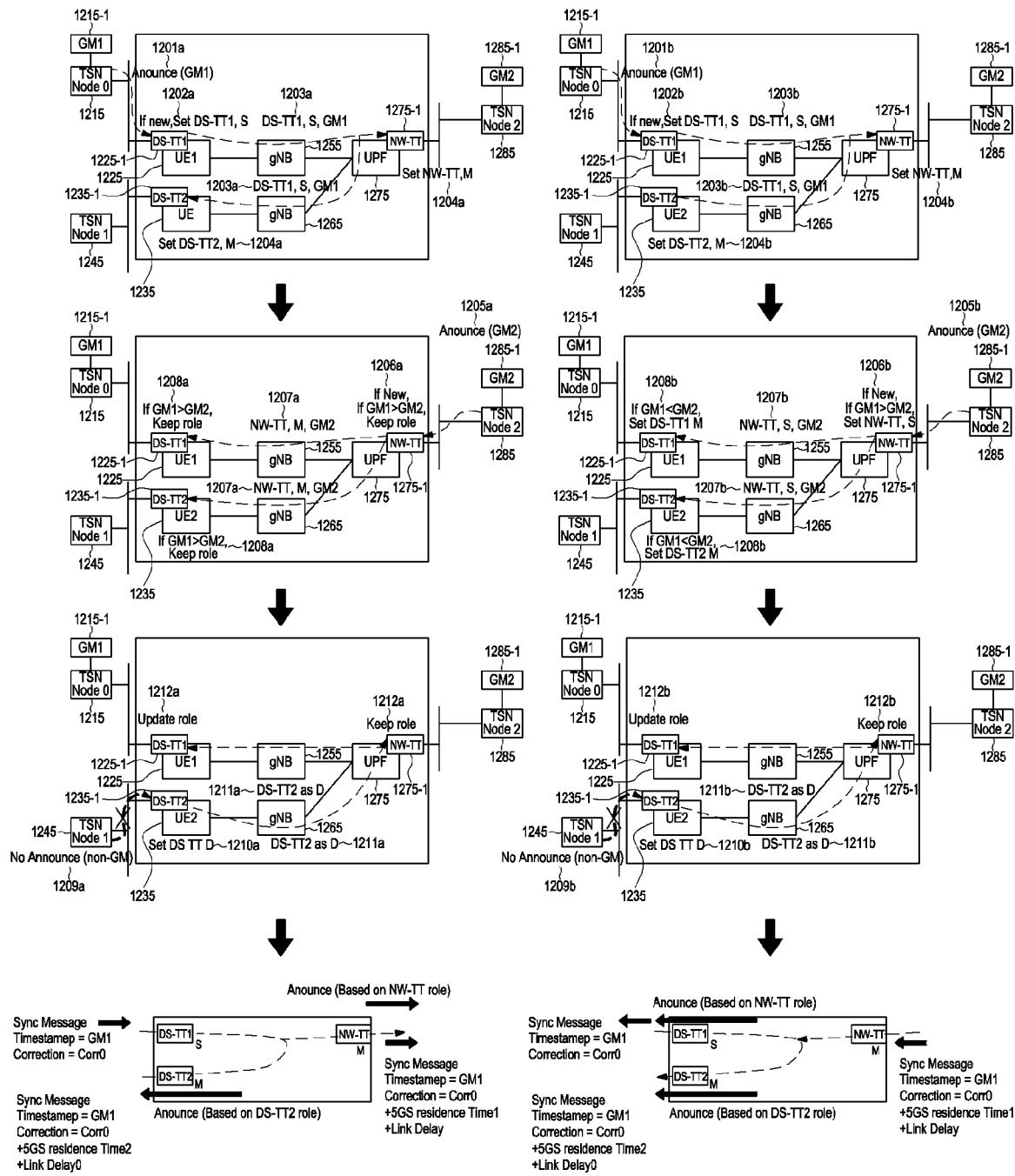
FIG. 12 illustrates a method for supporting a BMCA to which a user plane-based distributed information processing scheme is applied, according to an embodiment of the disclosure.

FIG. 12 illustrates operations and results of a method for supporting a BMCA to which a user plane-based distributed information processing scheme is applied, according to an embodiment of the disclosure. In FIG. 12, Case 1 corresponds to an example in which the priority of GM1 is higher than that of GM2, and Case 2 corresponds to an example in which the priority of GM1 is lower than that of GM2. FIG. 12 differs from FIG. 11 in that when no Announce message is received until the Announce message reception timer expires, this is recognized as a modified message in performing operations.

Case 1

Referring to FIG. 12, in operation 1201*a*, a TSN Node0 1215 having GM1 1215-1 as a clock source transmits an Announce message 0 to DS-TT1 1225-1 in UE1 1225. In operation 1202*a*, if the received Announce message 0 differs from the Announce message received immediately before, DS-TT1 1225-1 temporarily sets its role to S based on Announce message 0. In operation 1203*a*, DS-TT1 1225-1 adds information indicating that DS-TT1 1225-1 serves as S to Announce message 0 and broadcasts it to the NW-TT 1275-1 and DS-TT2 1235-1 through gNB 1265. In operation 1204*a*, upon receiving the Announce message 0 from DS-TT1 1225-1, the NW-TT 1275-1 in UPF 1275 sets its role to M. Likewise, in operation 1204*a*, upon receiving the Announce message 0 from DS-TT1 1225-1, DS-TT2 1235-1 in UE 1235 sets its role to M.

In operation 1205*a*, TSN Node1 1285 having GM2 1285-1 as a clock source transmits Announce message 1 to the NW-TT 1275-1. In operation 1206*a*, if the received Announce message 1 is compared with and differs from the Announce message received immediately before, the NW-TT 1275-1 determines whether to update its role based on Announce message 1. In other words, the NW-TT 1275-1 compares the priority of GM1 1215-1 for Announce message 0 with the priority of GM2 1285-1 for Announce message 1. Since the priority of GM1 1215-1 is higher than that of GM2 1285-1, the NW-TT 1275-1 maintains the role as M as previously set. In operation 1207*a*, the NW-TT 1275-1 adds information indicating that the NW-TT 1275-1 serves as M in Announce message 1 and broadcasts it to DS-TT1 1225-1 and DS-TT2 1235-1. In operation 1208*a*, upon receiving Announce message 1, DS-TT1 1225-1 compares the priority of GM1 1215-1 with the priority of GM2 1286-1 for Announce message 1. Since the priority of GM1 1215-1 is higher than that of GM2 1285-1, DS-TT1 1225-1 maintains its role as S. Likewise, in operation 108*a*, upon receiving the Announce message 1 from the NW-TT 1275-1, DS-TT2 1235-1 maintains its role as M.

In operation 1209*a*, if TSN Node1 1245, which does not have a clock source for GM, no longer transmits an Announce message to DS-TT2 1235-1, DS-TT2 1235-1 identifies whether an Announce message arrives within a predetermined time. In operation 1210*a*, upon identifying that an Announce message does not arrive within a predetermined time, DS-TT2 1235-1 changes its role to D. Alternatively, DS-TT2 1235-1 repeatedly identifies whether no Announce message arrives within a predetermined time and changes its role to D when the number of repetitions exceeds a specific value. In operation 1211*a*, DS-TT2 1235-1 adds information indicating that DS-TT2 1235-1 serves as D to the Announce message in the non-GM-Capable configuration received in the prior Announce reception period and broadcasts it to the NW-TT 1275-1 and DS-TT1 1225-1. In operation 1212*a*, the NW-TT 1275-1 and DS-TT1 1225-1 set whether to transfer a synchronization message to DS-TT2 1235-1 according to their roles. For example, since the priority of GM1 1215-1 is higher than the priority of GM2 1285-1 (GM1>GM2), DS-TT1 1225-1 serving as S determines that transmission of a synchronization message to DS-TT2 1235-1 is no longer necessary and does not transmit a synchronization message.

As such, when the priority of GM1 1215-1 is higher than the priority of GM2 1285-1 (GM1>GM2), the role of DS-TT1 1225-1 is set to S, the role of the NW-TT 1275-1 is set to M, and the role of DS-TT2 1235-1 is set to D, and each port transmits an Announce message to the outside according to its role and the Announce interval timer. In this case, DS-TT1 1225-1 serving as S transmits no Announce message to the outside. Thereafter, transmission of a synchronization message within the 5G network is performed from DS-TT1 1225-1, which serves as S, to the NW-TT 1275-1, which serve as M. The specific procedure follows the procedures described above in connection with FIG. 9.

Case 2

Referring to FIG. 12, in operation 1201*b*, TSN Node0 1215 having GM1 1215-1 as a clock source transmits Announce message 0 to DS-TT1 1225-1. In operation 1202*b*, if the received Announce message 0 is compared with and differs from the Announce message received immediately before, DS-TT1 1225-1 temporarily sets its role to S based on Announce message 0 through gNB 1255. In operation 1203*b*, DS-TT1 1225-1 adds information indicating that DS-TT1 1225-1 serves as S to Announce message 0 and broadcasts it to the NW-TT 1275-1 and DS-TT2 1235-1. In operation 1204*b*, upon receiving the Announce message 0 from DS-TT1 1225-1, the NW-TT 1275-1 sets its role to M (master). Likewise, in operation 1204*b*, upon receiving the Announce message 0 from DS-TT1 1225-1, DS-TT2 1235-1 sets its role to M.

In operation 1205*b*, TSN Node2 1285 having GM2 1285-1 as a clock source transmits Announce message 1 to the NW-TT 1275-1. In operation 1206*b*, if the received Announce message 2 is compared with and differs from the Announce message received immediately before, the NW-TT 1275-1 determines whether to update its role based on Announce message 2. In other words, the NW-TT 1275-1 compares the priority of GM1 1215-1 for Announce message 0 with the priority of GM2 1285-1 for Announce message 2. Since the priority of GM1 1215-1 is lower than that of GM2 1285-1 (GM1<GM2), the NW-TT 1275-1 changes its role to S. In operation 1207*b*, the NW-TT 1275-1 adds information indicating that NW-TT 1275-1 serves as S to the received Announce message 2 and broadcasts it to DS-TT1 1225-1 and DS-TT2 1235-1. In operation 1208*b*, upon receiving Announce message 2, DS-TT1 1225-1 compares the priority of GM1 1215-1 with the priority of GM2 1285-1 for Announce message 2. Since the priority of GM1 1215-1 is lower than that of GM2 1285-1, DS-TT1 1225-1 changes its role to M. Likewise, in operation 1208*b*, upon receiving the Announce message 2 from the NW-TT 1275-1, DS-TT2 1235-1 maintains its role as M.

In operation 1209*b*, if TSN Node1 1245, which does not have a clock source for GM, no longer transmits an Announce message to DS-TT2 1235-1, DS-TT2 1235-1 identifies whether an Announce message arrives within a predetermined time. In operation 1210*b*, upon identifying that an Announce message does not arrive within a predetermined time, DS-TT2 1235-1 changes its role to D. Alternatively, DS-TT2 1235-1 repeatedly identifies whether no Announce message arrives within a predetermined time and changes its role to D when the number of repetitions exceeds a specific value. In operation 1211b, DS-TT2 1235-1 adds information indicating that DS-TT2 1235-1 serves as D to the Announce message in the non-GM-Capable configuration received in the prior Announce reception period and broadcasts it to the NW-TT 1275-1 and DS-TT1 1225-1. In operation 1212b, the NW-TT 1275-1 and DS-TT1 1225-1 set whether to transfer a synchronization message to DS-TT2 1235-1 according to their roles. For example, since the priority of GM1 1215-1 is lower than the priority of GM2 1285-1, the NW-TT 1275-1 serving as S determines that transmission of a synchronization message to DS-TT2 1235-1 is no longer necessary and does not transmit a synchronization message.

As such, when the priority of GM1 1215-1 is lower than the priority of GM2 1285-1 (GM1<GM2), the role of the NW-TT 1275-1 is set to S, the role of DS-TT1 1225-1 is set to M, and the role of DS-TT2 1235-1 is set to D, and each port transmits an Announce message to the outside according to its role and the Announce interval timer. In this case, the NW-TT 1275-1 serving as S transmits no Announce message to the outside. Thereafter, transmission of a synchronization message within the 5G network is performed from the NW-TT 1275-1, which serves as S, to DS-TT1 1225-1, which serve as M. The specific procedure follows the procedures described above in connection with FIG. 9.

Figure 13:
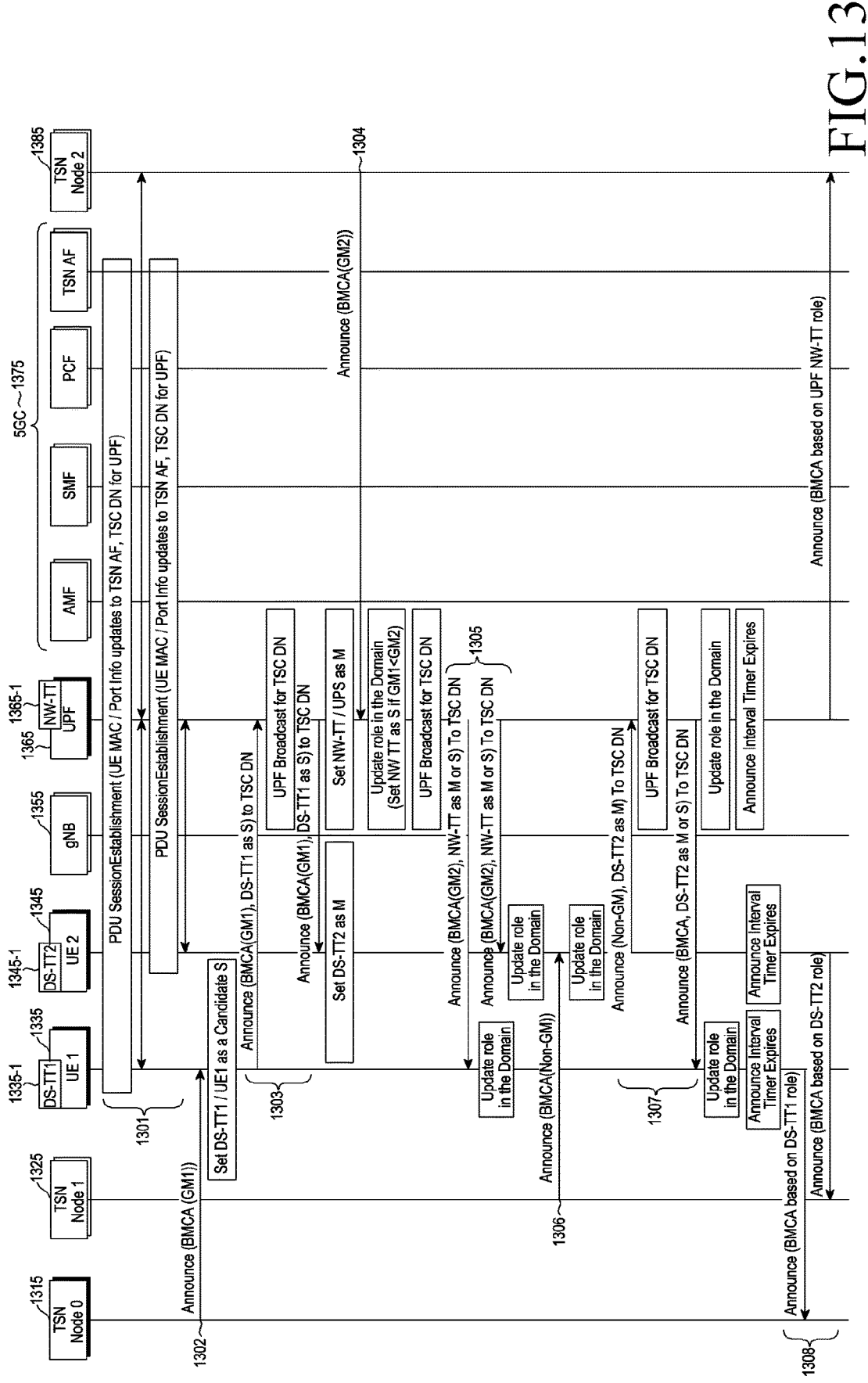
FIG. 13 illustrates a procedure in which a DS-TT and an NW-TT broadcast all Announce messages in a 5G network by applying a user plane-based distributed information processing scheme according to an embodiment of the disclosure.

FIG. 13 illustrates a procedure in which a DS-TT and an NW-TT broadcast all Announce messages in a 5G network by applying a user plane-based distributed information processing scheme according to an embodiment of the disclosure.

Referring to FIG. 13, in operation 1301, a UE1/DS-TT1 1335/1335-1 establishes a PDU session for time sensitive communications (TSC) DNN and single network slicing selection assistance information (S-NSSAI). UE1/DS-TT1 1335/1335-1 may communicate with TSN Node2 1385 via ethernet through a UPF/NW-TT 1365/1365-1 through the established PDU session. Similarly, UE2/DS-TT2 1345/1345-1 establishes a PDU session with the same TSC DNN/S-NSSAI. UE2/DS-TT2 1345/1345-1 may communicate over ethernet through the UPF/NW-TT 1365/1365-1 through the established PDU session.

In operation 1302, TSN Node0 1315 transmits BMCA Announce message 0 using GM1 as a clock source to DS-TT1/UE1 1335-1/1335. DS-TT1 1335-1 temporarily sets its role to S based on the received BMCA Announce message 0. In operation 1303, DS-TT1 1335-1 adds information role information for DS-TT1 1335-1 to the received BMCA Announce message 0 and broadcasts it to the NW-TT 1365-1 and DS-TT2 1345-1. The broadcast is delivered to all the ports in the UPF specified by the corresponding TSC DNN/S-NSSAI. The NW-TT 1365-1 and DS-TT2 1345-1 update their roles based on the received BMCA Announce message 0. For example, the NW-TT 1365-1 sets its role to M, and DS-TT2 1345-1 sets its role to M.

In operation 1304, TSN Node0 1385 transmits BMCA Announce message 2 using GM2 as a clock source to the NW-TT/UPF 1365-1. The NW-TT 1365-1 update its role based on the received BMCA Announce message 2. In other words, if the priorities of GM1 and GM2 are compared with each other, and the priority of GM1 is higher than the priority of GM2 (GM1>GM2), the NW-TT 1365-1 maintains its role as M and, if the priority of GM2 is higher (GM1<GM2), changes its role to S. In operation 1305, the NW-TT 1365-1 adds information role information for the NW-TT 1365-1 to the received BMCA Announce message 2 and broadcasts it to DS-TT1 1335-1 and DS-TT2 1345-1. The broadcast is delivered to all the ports in the UPF specified by the corresponding TSC DNN/S-NSSAI. DS-TT1 1335-1 and DS-TT2 1345-1 update their roles based on the received BMCA Announce message 2. In other words, DS-TT1 1335-1 compares the priorities of GM1 and GM2 and, if the priority of GM1 is higher (GM1>GM2), DS-TT1 1335-1 maintains its role as S and, if the priority of GM2 is higher (GM1<GM2), changes its role to M. DS-TT2 1345-1 maintains its role as M. DS-TT2 1345-1 maintains its role as M.

In operation 1306, TSN Node1 1325 transmits Announce message 1 in a non-GM-Capable configuration, indicating that there is no clock source, to DS-TT2/UE2 1345-1/1345. DS-TT2 1345-1 update its role based on the received BMCA Announce message 1. In other words, DS-TT2 1345-1 compares the priorities of GM1 (or GM2) and non-GM-Capable and, if the priority of GM1 (or GM2) is higher than that of non-GM-Capable, maintains its role as M as previously set. In operation 1307, DS-TT2 1345-1 adds information role information for DS-TT2 1345-1 to the received BMCA Announce message 1 and broadcasts it to the NW-TT 1365-1 and DS-TT1 1335-1. The broadcast is delivered to all the ports in the UPF specified by the corresponding TSC DNN/S-NSSAI. The NW-TT 1365-1 and DS-TT2 1345-1 update their roles based on the received BMCA Announce message 1. In other words, if the priority of GM1 is higher than GM2 (GM1>GM2), DS-TT1 1335-1 compares the priority of GM1 and the priority of non-GM-Capable and, since the priority of GM1 is higher, DS-TT1 1335-1 maintains its role as S. The NW-TT 1365-1 compares the priorities of GM1 and non-GM-Capable and, since the priority of GM1 is higher, the NW-TT 1365-1 maintains its role as M. If the priority of GM2 is higher than GM1 (GM1<GM2), DS-TT1 1335-1 compares the priorities of GM2 and non-GM-Capable and, since the priority of GM2 is higher, it maintains its role as M, and the NW-TT 1365-1 compares the priorities of GM2 and non-GM-Capable and, since the priority of GM2 is higher, it maintains its role as S.

In operation 1308, DS-TT1 1335-1, DS-TT2 1345-1, and NW-TT 1365-1 each transmit an Announce message according to their role and the Announce interval timer indicating the period of delivering the Announce message. In other words, DS-TT1 1335-1 (GM1>GM2) or NW-TT 1365-1 (GM1<GM2) does not transmit an Announce message for BMCA to the outside. According to the predetermined role, a synchronization message in the 5G network is transmitted from the port serving as S to the ports serving as M's. The specific procedure follows the procedures described above in connection with FIG. 9.

The system may further include a 5GC 1375 and a gNB 1355.

Figure 14:
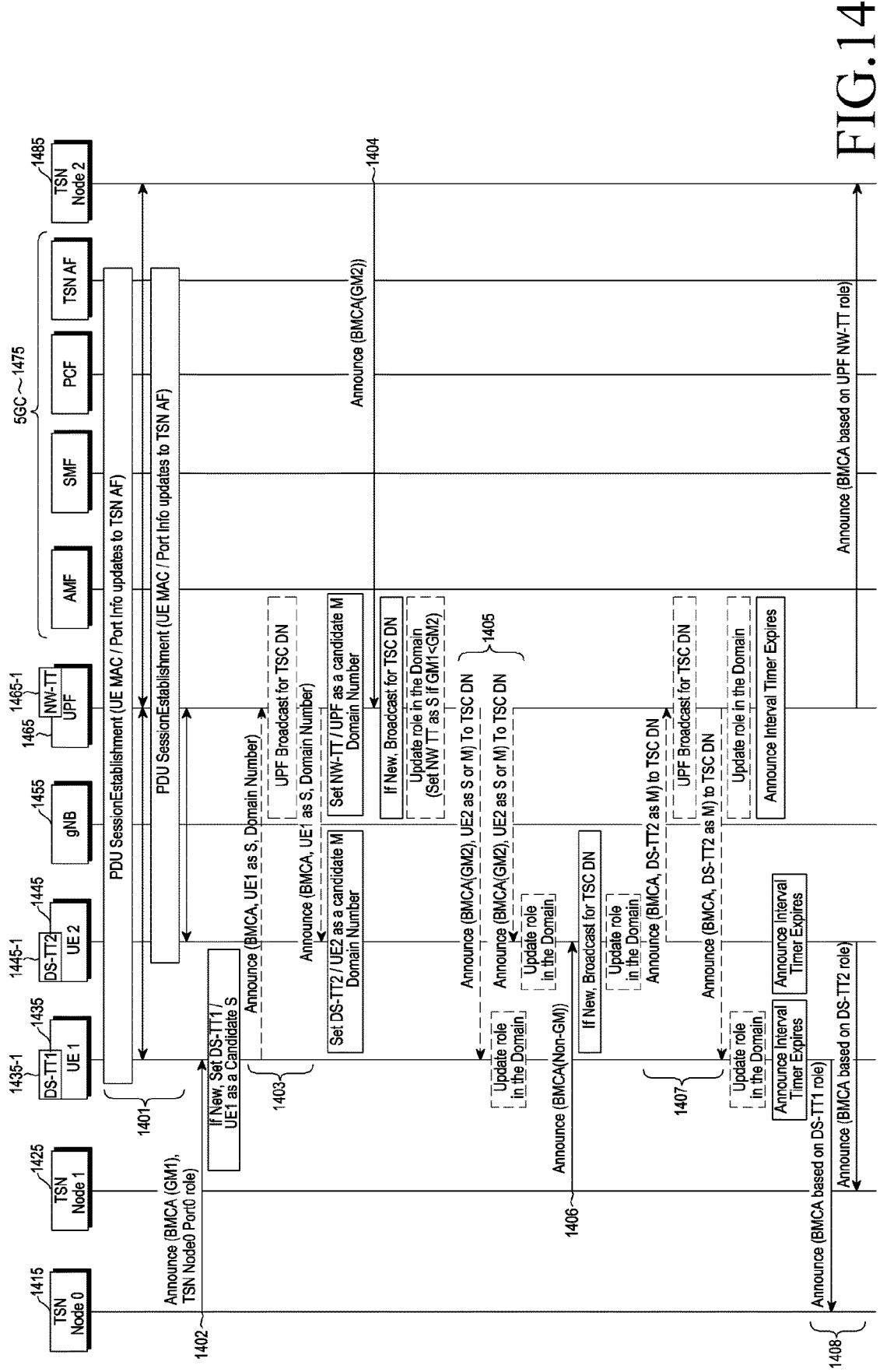
FIG. 14 illustrates a procedure in which a DS-TT and an NW-TT effectively broadcast Announce messages in a 5G network by applying a user plane-based distributed information processing scheme according to an embodiment of the disclosure.

FIG. 14 illustrates a procedure in which a DS-TT and an NW-TT effectively broadcast Announce messages in a 5G network by applying a user plane-based distributed information processing scheme according to an embodiment of the disclosure.

Referring to FIG. 14, in operation 1401, a UE1/DS-TT1 1435/1435-1 establishes a PDU session for TSC DNN and S-NSSAI. UE1/DS-TT1 1435/1435-1 may communicate with TSN Node2 1485 via ethernet through a UPF/NW-TT 1465/1465-1 through the established PDU session. Similarly, UE2/DS-TT2 1445/1445-1 establishes a PDU session with the same TSC DNN/S-NSSAI. UE2/DS-TT2 1445/1445-1 may communicate over ethernet through the UPF/NW-TT 1465/1465-1 through the established PDU session.

In operation 1402, TSN Node0 1415 transmits BMCA Announce message 0 using GM1 as a clock source to DS-TT1/UE1 1435/1435-1. DS-TT1 1435-1 compares the received BMCA Announce message 0 with the Announce message received in the previous Announce message reception period. If BMCA Announce message 0 is the same as the Announce message received in the previous period, DS-TT1 1435-1 takes no action. If BMCA Announce message 0 is different from the Announce message received in the previous period, DS-TT1 1435-1 temporarily sets its role to S based on the received Announce message 0. In operation 1403, DS-TT1 1435-1 adds information role information for DS-TT1 1435-1 to the received BMCA Announce message 0 and broadcasts it to the NW-TT 1465-1 and DS-TT2 1445-1. The broadcast is delivered to all the ports in the UPF specified by the corresponding TSC DNN/S-NSSAI. The NW-TT 1465-1 and DS-TT2 1445-1 update their roles based on the received BMCA Announce message 0. For example, the NW-TT 1465-1 sets its role to M, and DS-TT2 1445-1 sets its role to M.

In operation 1404, TSN Node0 1485 transmits BMCA Announce message 2 using GM2 as a clock source to the NW-TT/UPF 1465-1/1465. The NW-TT 1465-1 compares the received BMCA Announce message 2 with the Announce message received in the previous Announce message reception period. If BMCA Announce message 2 is the same as the Announce message received in the previous period, the NW-TT 1465-1 takes no action. If BMCA Announce message 2 is different from the Announce message received in the previous period, the NW-TT 1465-1 updates its role based on the received BMCA Announce message 2. In other words, if the NW-TT 1465-1 compares the priorities of GM1 and GM2, and the priority of GM1 is higher (GM1>GM2), the NW-TT 1465-1 maintains its role as M and, if the priority of GM2 is higher (GM1<GM2), changes its role to S. In operation 1405, the NW-TT 1465-1 adds information role information for the NW-TT 1465-1 to the received BMCA Announce message 2 and broadcasts it to DS-TT1 1435-1 and DS-TT2 1445-1. The broadcast is delivered to all the ports in the UPF specified by the corresponding TSC DNN/S-NSSAI. DS-TT1 1335 and DS-TT2 1345 update their roles based on the received BMCA Announce message 2. DS-TT1 1335 compares the priorities of GM1 and GM2, and if the priority of GM1 is higher (GM1>GM2), DS-TT1 1335 maintains its role as S and, if the priority of GM2 is higher (GM1<GM2), changes its role to M. DS-TT2 1345 maintains its role as M. DS-TT2 maintains its role as M.

In operation 1406, TSN Node 1 1425 transmits Announce message 1 in a non-GM-Capable configuration, indicating that there is no clock source, to DS-TT2/UE2 1445-1/1445. DS-TT2 1445-1 compares the received BMCA Announce message 1 with the Announce message received in the previous Announce message reception period. If BMCA Announce message 1 is the same as the Announce message received in the previous period, DS-TT2 1445-1 takes no action. If BMCA Announce message 1 is different from the Announce message received in the previous period, DS-TT2 1445-1 updates its role based on the received BMCA Announce message 1. In other words, DS-TT2 1445-1 compares the priorities of GM1 (or GM2) and non-GM-Capable and, since the priority of GM1 (or GM2) is higher than that of non-GM-Capable, maintains its role as M as previously set. In operation 1407, DS-TT2 1445-1 adds information role information for DS-TT2 1445-1 to the received BMCA Announce message 1 and broadcasts it to the NW-TT 1465-1 and DS-TT1 1435-1. The broadcast is delivered to all the ports in the UPF specified by the corresponding TSC DNN/S-NSSAI. The NW-TT 1465-1 and DS-TT2 1445-1 update their roles based on the received BMCA Announce message 1. In other words, if the priority of GM1 is higher than GM2 (GM1>GM2), DS-TT1 1435-1 compares the priority of GM1 and the priority of non-GM-Capable and, since the priority of GM1 is higher, DS-TT1 1335-1 maintains its role as S. The NW-TT 1465-1 compares the priorities of GM1 and non-GM-Capable and, since the priority of GM1 is higher, the NW-TT 1365-1 maintains its role as M. If the priority of GM2 is higher than GM1 (GM1<GM2), DS-TT1 1435-1 compares the priorities of GM2 and non-GM-Capable and, since the priority of GM2 is higher, it maintains its role as M, and the NW-TT 1465-1 compares the priorities of GM2 and non-GM-Capable and, since the priority of GM2 is higher, it maintains its role as S.

In operation 1408, DS-TT1 1435-1, DS-TT2 1445-1, and NW-TT 1465-1 each transmit an Announce message according to their role and the Announce interval timer indicating the period of delivering the Announce message. DS-TT1 1435-1 (GM1>GM2) or NW-TT 1465-1 (GM1<GM2) does not transmit an Announce message for BMCA to the outside. In this case, according to the predetermined role, a synchronization message in the 5G network is transmitted from the port serving as S to the ports serving as M's. The specific procedure follows the procedures described above in connection with FIG. 9.

The system may further include a 5GC 1475 and a gNB 1455.

Figure 15:
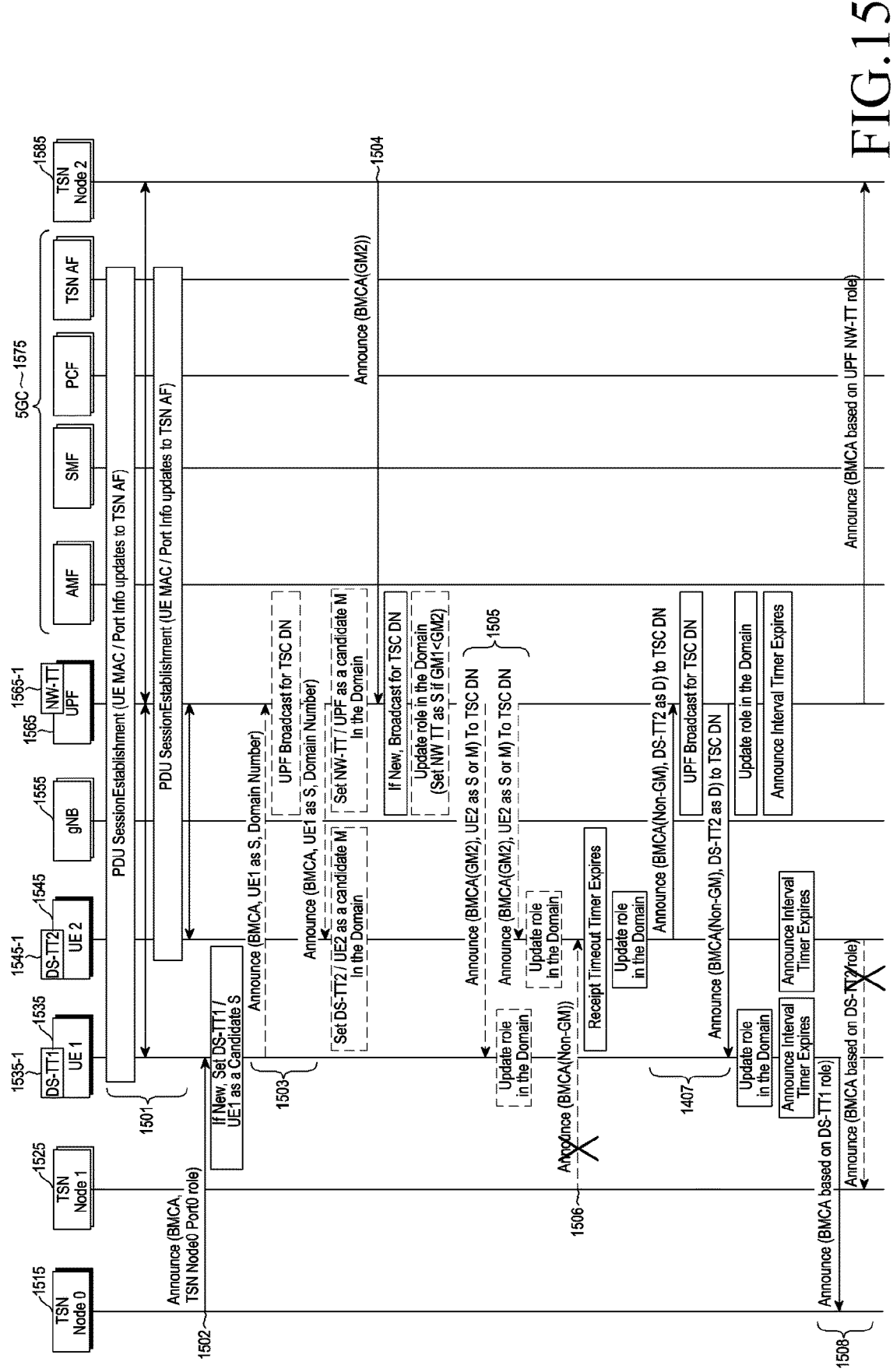
FIG. 15 illustrates a procedure in which a DS-TT and an NW-TT process Announce messages indicating an inactive state by applying a user plane-based distributed information processing scheme according to an embodiment of the disclosure.

FIG. 15 illustrates a procedure in which a DS-TT and an NW-TT process Announce messages indicating an inactive state by applying a user plane-based distributed information processing scheme according to an embodiment of the disclosure.

FIG. 15 differs from FIG. 14 in that when no Announce message is received until the Announce message reception timer expires, this is recognized as a modified message in performing operations.

Referring to FIG. 15, in operation 1501, a UE1/DS-TT1 1535/1535-1 establishes a PDU session for TSC DNN and S-NSSAI. UE1/DS-TT1 1535/1535-1 may communicate with TSN Node2 1585 via ethernet through a UPF/NW-TT 1565/1565-1 through the established PDU session. Similarly, UE2/DS-TT2 1545/1545-1 establishes a PDU session with the same TSC DNN/S-NSSAI. UE2/DS-TT2 1545/1545-1 may communicate over ethernet through the UPF/NW-TT 1565/1565-1 through the established PDU session.

In operation 1502, TSN Node0 1515 delivers BMCA Announce message 0 using GM1 as a clock source to DS-TT1/UE1 1535-1/1535. DS-TT1 1535-1 compares the received BMCA Announce message 0 with the Announce message received in the previous Announce message reception period. If BMCA Announce message 0 is the same as the Announce message received in the previous period, DS-TT1 1535-1 takes no action. If BMCA Announce message 0 is different from the Announce message received in the previous period, DS-TT1 1535-1 temporarily sets its role to S based on the received Announce message 0. In operation 1503, DS-TT1 1535-1 adds information role information for DS-TT1 1535-1 to the received BMCA Announce message 0 and broadcasts it to the NW-TT 1565-1 and DS-TT2 1545-1. The broadcast is delivered to all the ports in the UPF specified by the corresponding TSC DNN/S-NSSAI. The NW-TT 1565-1 and DS-TT2 1545-1 update their roles based on the received BMCA Announce message 0. For example, the NW-TT 1565-1 sets its role to M, and DS-TT2 1545-1 sets its role to M.

In operation 1504, TSN Node0 1585 transmits BMCA Announce message 2 using GM2 as a clock source to the NW-TT/UPF 1565-1/1565. The NW-TT 1565-1 compares the received BMCA Announce message 2 with the Announce message received in the previous Announce message reception period. If BMCA Announce message 2 is the same as the Announce message received in the previous period, the NW-TT 1565-1 takes no action. If BMCA Announce message 2 is different from the Announce message received in the previous period, the NW-TT 1565-1 updates its role based on the received BMCA Announce message 2. In other words, if the NW-TT 1465-1 compares the priorities of GM1 and GM2, and the priority of GM1 is higher (GM1>GM2), the NW-TT 1465-1 maintains its role as M and, if the priority of GM2 is higher (GM1<GM2), changes its role to S. In operation 1505, the NW-TT 1565-1 adds information role information for the NW-TT 1565-1 to the received BMCA Announce message 2 and broadcasts it to DS-TT1 1535-1 and DS-TT2 1545-1. The broadcast is delivered to all the ports in the UPF specified by the corresponding TSC DNN/S-NSSAI. DS-TT1 1535-1 and DS-TT2 1545-1 update their roles based on the received BMCA Announce message 2. DS-TT1 1535-1 compares the priorities of GM1 and GM2, and if the priority of GM1 is higher (GM1>GM2), DS-TT1 1335 maintains its role as S and, if the priority of GM2 is higher (GM1<GM2), changes its role to M. DS-TT2 1545-1 maintains its role as M. DS-TT2 maintains its role as M.

In operation 1506, TSN Node 1 1525 periodically repeats transmission of Announce message 1 in a non-GM-Capable configuration, indicating that there is no clock source, to DS-TT2/UE2 1545-1/1545 and then stops the transmission. DS-TT2 1545-1 records and manages that BMCA Announce message 1 is not received in the current Announce reception period. DS-TT2 1445 identifies that no more Announce message is received in accordance with the receipt timeout timer. After identifying that an Announce message does not arrive within a predetermined time, DS-TT2 1545-1 changes its role to D (Disabled). Alternatively, DS-TT2 1545-1 may repeatedly identify whether no Announce message arrives within a predetermined time and change its role to D when the number of repetitions exceeds a specific value. In operation 1507, DS-TT2 1545-1 adds information role information for DS-TT2 to the previously received BMCA Announce message and broadcasts it to the NW-TT 1565-1 and DS-TT1 1535-1. The broadcast is delivered to all the ports in the UPF specified by the corresponding TSC DNN/S-NSSAI. The NW-TT 1565-1 and DS-TT1 1535-1 update their roles based on the previous BMCA message received from DS-TT2 1545-1. In other words, the NW-TT 1565-1 and DS-TT1 1535-1 set whether or not to transfer a synchronization message to DS-TT2 1545-1 according to their role. If the priority of GM1 is higher than that of GM2 (GM1>GM2), DS-TT1 1535-1 serving as S determines that it is not necessary any longer to transfer a synchronization message to DS-TT2 1445-1 and sets to transfer no synchronization message. If the priority of GM1 is lower than the priority of GM2 (GM1<GM2), the NW-TT 1565-1 serving as S determines that transmission of a synchronization message to DS-TT2 1545-1 is no longer necessary and sets to transmit no synchronization message.

In operation 1508, DS-TT1 1535-1, DS-TT2 1545-1, and NW-TT 1565-1 each transmit an Announce message according to their role and the Announce interval timer indicating the period of delivering the Announce message. DS-TT1 1535-1 (GM1>GM2) or NW-TT 1565-1 (GM1<GM2) does not transmit an Announce message for BMCA to the outside. According to the predetermined role, a synchronization message in the 5G network is transmitted from the port serving as S to the ports serving as M's. In other words, no more synchronization message is transferred to DS-TT2 1545-1 serving as D. The specific procedure follows the procedures described above in connection with FIG. 9.

Meanwhile, in the BMCA process of FIGS. 10 to 15, the BMCA function may be performed by the UPF or NW-TT instead of the DS-TT. In this case, a DS-TT1 surrogate logic in the UPF or NW-TT or a DS-TT2 surrogate logic in the UPF or NW-TT is in charge of the function of determining a role by DS-TT1 or DS-TT2. 5GS internal messages from the NW-TT to DS-TT1 or DS-TT2 may be synced with the Announce interval timer. A DS-TT1 surrogate logic in the UPF or NW-TT or a DS-TT2 surrogate logic in the UPF or NW-TT may be in charge of the function of generating an Announce message for 5GS outside by DS-TT1 or DS-TT2.

All of the BMCA processes of FIGS. 5 to 15 are supported for each TSN domain. The Announce message or synchronization message has a field indicating the corresponding domain.

The system may further include a 5GC 1575 and a gNB 1555.

Figure 16:
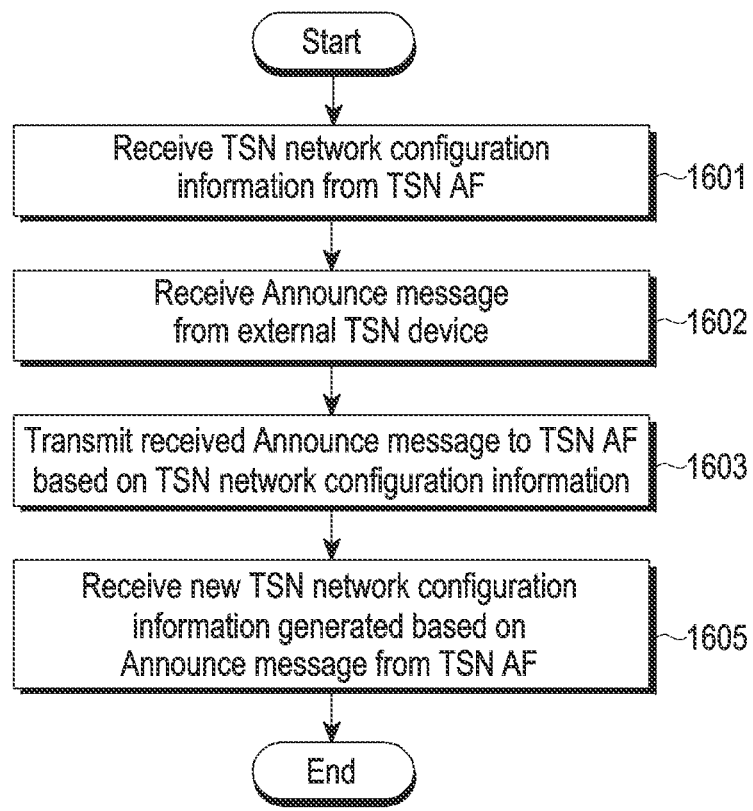
FIG. 16 illustrates a network DS-TT operation supporting a BMCA to which a control plane-based centralized information processing scheme in a 5G network system according to an embodiment of the disclosure.

FIG. 16 illustrates a network DS-TT operation supporting a BMCA to which a control plane-based centralized information processing scheme in a 5G network system according to an embodiment of the disclosure. The DS-TT of FIG. 16 operates based on the DS-TT operations described above in connection with FIGS. 5 to 9.

Referring to FIG. 16, in operation 1601, the DS-TT receives TSN network configuration information from the TSN AF. The TSN network configuration information may include, e.g., port configuration information, a system identity, an Announce message reception period (Announce interval), and an Announce message reporting condition (Announce reporting mode).

In operation 1602, the DS-TT receives an Announce message from an external TSN device. The Announce message includes a Port Announce message.

In operation 1603, the DS-TT transmits the received Announce message to the TSN AF based on the TSN network configuration information. In this case, the DS-TT delivers the received Announce message to the TSN AF through the SMF.

In operation 1604, the DS-TT receives new TSN network configuration information generated based on the Announce message from the TSN AF.

Figure 17:
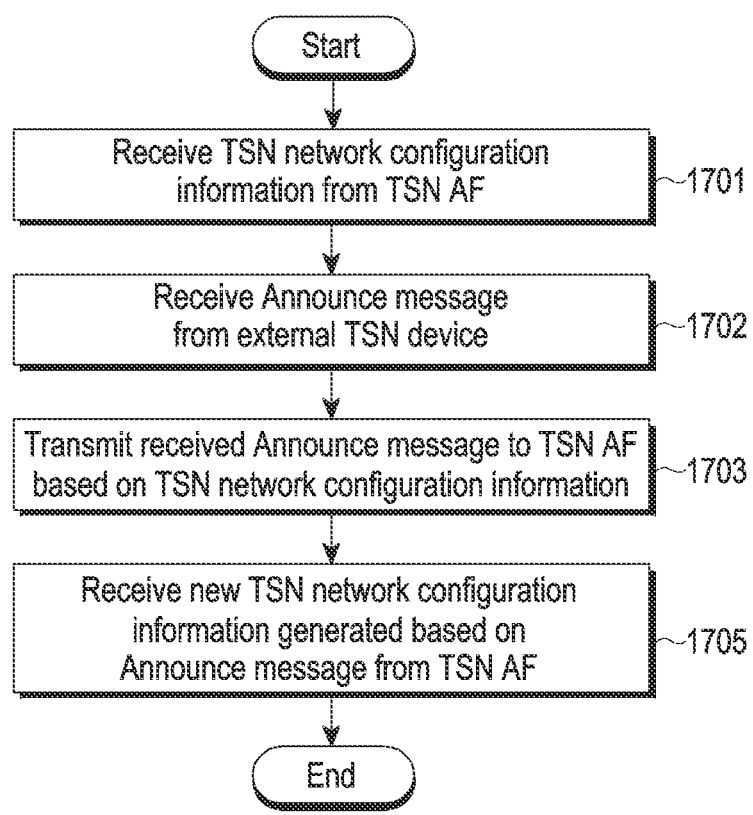
FIG. 17 illustrates a network NW-TT operation supporting a BMCA to which a control plane-based centralized information processing scheme in a 5G network system according to an embodiment of the disclosure.

FIG. 17 illustrates a network NW-TT operation supporting a BMCA to which a control plane-based centralized information processing scheme in a 5G network system according to an embodiment of the disclosure. The NW-TT of FIG. 17 operates based on the NW-TT operations described above in connection with FIGS. 5 to 9.

Referring to FIG. 17, in operation 1701, the NW-TT receives TSN network configuration information from the TSN AF. The TSN network configuration information may include, e.g., port configuration information, a system identity, an Announce message reception period (Announce interval), and an Announce message reporting condition (Announce reporting mode).

In operation 1702, the NW-TT receives an Announce message from an external TSN device. The Announce message includes a Port Announce message.

In operation 1703, the NW-TT transmits the received Announce message to the TSN AF based on the TSN network configuration information. In this case, the DS-TT delivers the received Announce message to the TSN AF through the SMF.

In operation 1704, the NW-TT receives new TSN network configuration information generated based on the Announce message from the TSN AF.

Figure 18:
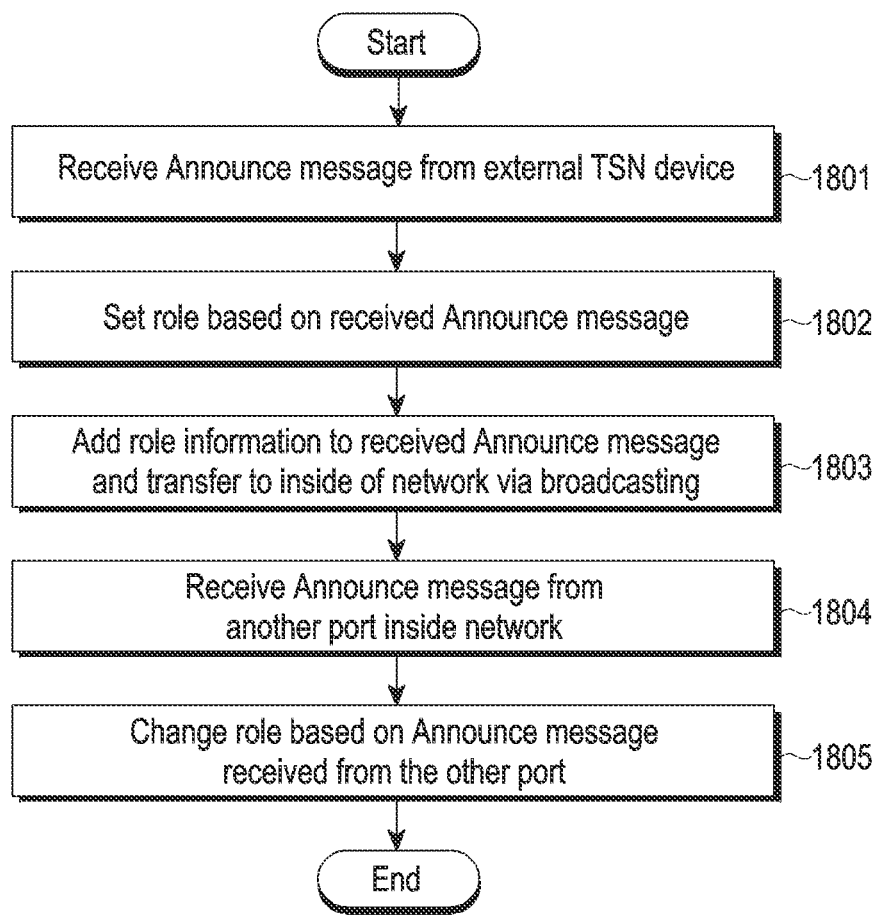
FIG. 18 illustrates operations of a DS-TT supporting a BMCA to which a user plane-based distributed information processing scheme is applied in a 5G network system according to an embodiment of the disclosure.

FIG. 18 illustrates operations of a DS-TT supporting a BMCA to which a user plane-based distributed information processing scheme is applied in a 5G network system according to an embodiment of the disclosure. The DS-TT of FIG. 18 operates based on the DS-TT operations described above in connection with FIGS. 10 to 15.

Referring to FIG. 18, in operation 1801, the DS-TT receives an Announce message from an external TSN device.

In operation 1802, the DS-TT sets its role based on the received Announce message.

In operation 1803, the DS-TT broadcasts Announce messages including information indicating its role to other ports in the network. In this case, when the Announce message received from the external TSN device is different from the Announce message received in the previous Announce reception period, the DS-TT may deliver the Announce message received from the external TSN device to the inside of the network.

In operation 1804, the DS-TT receives an Announce message from another port inside the network.

In operation 1805, the DS-TT changes its role based on the Announce message received from the other port. If information about a GM having a higher priority is included in the Announce message received from the other port, the DS-TT changes its role. In contrast, if the Announce message received from the other port contains information about a GM having a lower priority, the DS-TT maintains its role.

Figure 19:
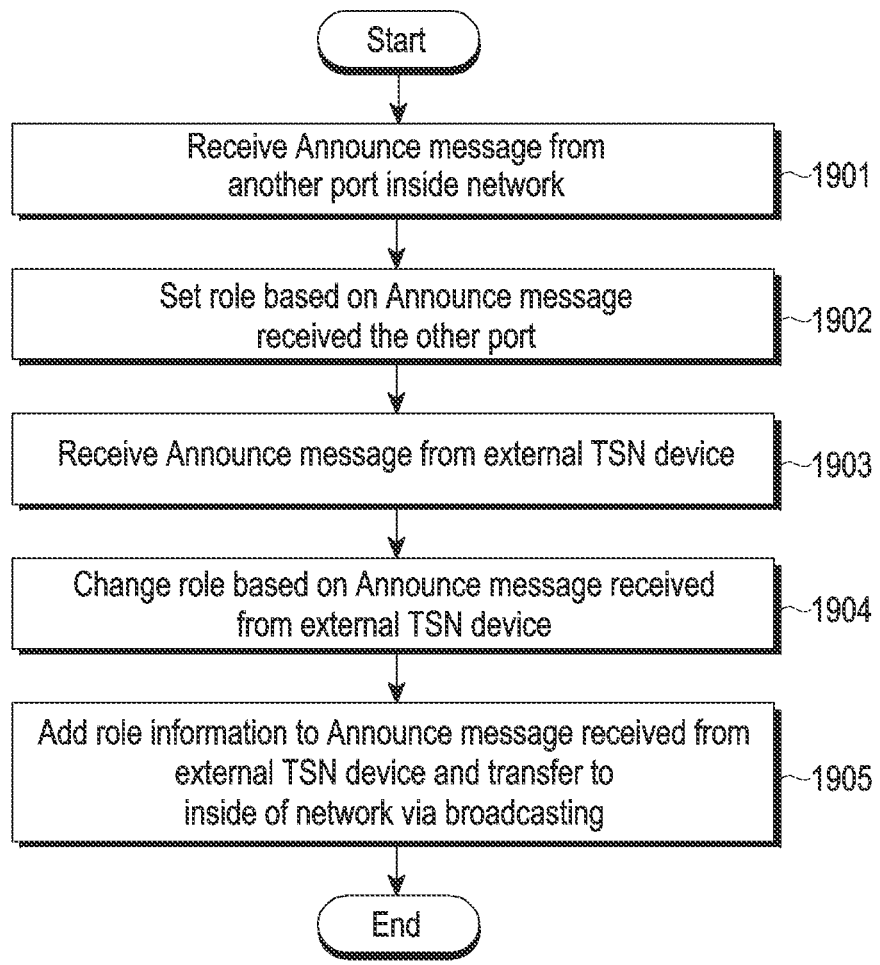
FIG. 19 illustrates operations of an NW-TT supporting a BMCA to which a user plane-based distributed information processing scheme in a 5G network system according to an embodiment of the disclosure.

FIG. 19 illustrates operations of an NW-TT supporting a BMCA to which a user plane-based distributed information processing scheme in a 5G network system according to an embodiment of the disclosure. The NW-TT of FIG. 19 operates based on the MW-TT operations described above in connection with FIGS. 10 to 15.

Referring to FIG. 19, in operation 1901, the NW-TT receives an Announce message from another port inside the network via broadcasting.

In operation 1902, the NW-TT sets its role based on the received Announce message.

In operation 1903, the NW-TT receives an Announce message from an external TSN device.

In operation 1904, the NW-TT changes its role based on the Announce message received from the external TSN device. In other words, if the Announce message received from the external TSN device contains information about a GM having a higher priority than the Announce message received from the DS-TT, the NW-TT changes its role. The NW-TT maintains its role if the Announce message received from the external TSN device contains information about a GM having a lower priority than the Announce message received from the DS-TT.

In operation 1905, the NW-TT broadcasts the Announce message received from the TSN external device, to which information indicating its role is added, to other ports inside the network.

Figure 20:
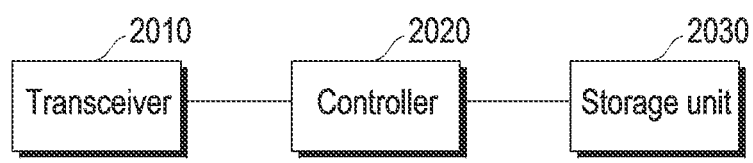
FIG. 20 illustrates structures of network entities according to an embodiment of the disclosure.

FIG. 20 illustrates structures of network entities according to an embodiment of the disclosure. Network entities according to an embodiment may include a DS-TT, a UE having the function of a DS-TT, an NW-TT, a UPF having the function of a NW-TT, an SMF, a PCF, and a TSN AF.

Referring to FIG. 20, the network entity may include a transceiver 2010, a controller 2020, and a storage unit 2030. The controller 2020 may be defined as a circuit or application-specific integrated circuit or at least one processor.

The transceiver 2010 may transmit and receive signals to/from other network entities. The transceiver 2010 may receive system information from, e.g., a base station, and may receive a synchronization signal or a reference signal.

The controller 2020 may control the overall operation of the network entity according to an embodiment. For example, the controller 2020 may control the signal flow between blocks to perform the operations according to the procedures described above in connection with FIGS. 5 to 15. For example, the controller 2020 may control the operations proposed in the disclosure to provide service detection in the mobile communication system according to the above-described embodiments.

The storage unit 2030 may store at least one of information transmitted/received via the transceiver 2010 and information generated via the controller 2020. For example, the storage unit 2030 may store information required for service detection according to the above-described embodiments.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of a network side time synchronization network (TSN) translator (NW-TT) comprising:
   receiving a first announce message via user plane from a first device side TSN translator (DS-TT) using a first packet data unit (PDU) session between the NW-TT and the first DS-TT;
   receiving a second announce message from a N6 interface;
   determining port states for each port of the first DS-TT and the NW-TT with the first announce message and the second announce message using a best master clock algorithm (BMCA) procedure;
   if grandmaster clock (GM) is external to a time synchronization network including the NW-TT and the first DS-TT, generating a third announce message based on the first announce message and the second announce message for each master port in the first DS-TT and the NW-TT; and
   transmitting the third announce message to the first PDU session related to the master port in the first DS-TT.

2. The method of claim 1, further comprising:
   performing PDU session establishment procedure for an Ethernet with the DS-TT for generating the first PDU session between the NW-TT and the first DS-TT.

3. The method of claim 1, wherein the first announce message and the second announce message are periodically received.

4. The method of claim 1, wherein the determining of the port states comprises:
   identifying a first GM related to the first announce message;
   identifying a second GM related to the second announce message;
   comparing a priority of the first GM and a priority of the second GM; and
   determining the port states for each port of the first DS-TT and the NW-TT based on the comparison.

5. The method of claim 1, further comprising:
receiving a fourth announce message via the user plane from a second DS-TT using a second PDU session between the NW-TT and the second DS-TT,
wherein the fourth announce message is not related to any GM.

6. The method of claim 1, further comprising:
monitoring whether a receipt timeout event occurs for a slave port in the NW-TT; and
upon detection of the receipt timeout event, re-evaluating the port states for each port of the first DS-TT and the NW-TT.

7. The method of claim 6, wherein the receipt timeout event occurs when no announce message is received until a receipt timeout timer expires.

8. The method of claim 6, wherein the receipt timeout event occurs when a number of times that no announce message is received until a receipt timeout timer expires reaches predetermined number.

9. The method of claim 1,
wherein the NW-TT is included in a user plane function (UPF) entity, and
wherein the first DS-TT is included in a user equipment (UE).

10. The method of claim 1,
wherein the generating the third announce message comprises:
determining an announce interval for the third announce message using a time synchronization information included in a bridge management information container (BMIC) obtained from a TSN application function (AF).

11. A network side time synchronization network (TSN) translator (NW-TT) comprising:
a plurality of ports comprising a first port and a second ports; and
a processor configured to:
control the first port of the plurality of the ports to receive a first announce message via user plane from a first device side TSN translator (DS-TT) using a first packet data unit (PDU) session between the NW-TT and the first DS-TT,
control the second port of the plurality of the ports to receive a second announce message from a N6 interface,
determine port states for each port of the first DS-TT and the NW-TT with the first announce message and the second announce message using a best master clock algorithm (BMCA) procedure,
if grandmaster clock (GM) is external to a time synchronization network including the NW-TT and the first DS-TT, generating a third announce message based on the first announce message and the second announce message for each master port in the first DS-TT and the NW-TT, and
control the first port of the plurality of the ports to transmit the third announce message to the first PDU session related to the master port in the first DS-TT.

12. The NW-TT of claim 11, wherein the processor is further configured to:
perform PDU session establishment procedure for an Ethernet with a DS-TT for generating the first PDU session between the NW-TT and the first DS-TT.

13. The NW-TT of claim 11, wherein the first announce message and the second announce message is periodically received.

14. The NW-TT of claim 11, wherein the processor is configured to:
identify a first GM related to the first announce message,
identify a second GM related to the second announce message,
compare a priority of the first GM and a priority of the second GM, and
determine the port states for each port of the first DS-TT and the NW-TT based on the comparison.

15. The NW-TT of claim 11,
wherein the plurality of the ports further comprise a third port, and
wherein the processor is further configured to control the third port of the plurality of the ports to receive a fourth announce message via the user plane from a second DS-TT using a second PDU session between the NW-TT and the second DS-TT, and
wherein the fourth announce message is not related to any GM.

16. The NW-TT of claim 11, wherein the processor is further configured to:
monitor whether a receipt timeout event occurs for a slave port in the NW-TT; and
upon detection of the receipt timeout event, re-evaluate the port states for each port of the first DS-TT and the NW-TT.

17. The NW-TT of claim 16, wherein the receipt timeout event occurs when no announce message is received until a receipt timeout timer expires.

18. The NW-TT of claim 16, wherein the receipt timeout event occurs when a number of times that no announce message is received until a receipt timeout timer expires reaches predetermined number.

19. The NW-TT of claim 11,
wherein the NW-TT is included in a user plane function (UPF) entity, and
wherein the first DS-TT is included in a user equipment (UE).

20. The NW-TT of claim 11,
wherein, when generating the third announce message, the processor is configured to:
determine an announce interval for the third announce message using a time synchronization information included in a bridge management information container (BMIC) obtained from a TSN application function (AF).

* * * * *